(12) United States Patent
Yang et al.

(10) Patent No.: US 8,058,200 B2
(45) Date of Patent: Nov. 15, 2011

(54) CATALYSTS FOR OLEFIN POLYMERIZATION

(75) Inventors: Qing Yang, Bartlesville, OK (US);
Michael D. Jensen, Laurel, MD (US);
Matthew G. Thorn, Lebanon, OH (US);
Kumudini C. Jayaratne, Helsinki (FI);
Tony R. Crain, Niotaze, KS (US)

(73) Assignee: Chevron Phillips Chemical Company, L.P., The Woodlands, TX (US)

(*) Notice: Subject to any disclaimer, the term of this patent is extended or adjusted under 35 U.S.C. 154(b) by 908 days.

(21) Appl. No.: 11/749,799

(22) Filed: May 17, 2007

(65) Prior Publication Data

US 2008/0287721 A1 Nov. 20, 2008

(51) Int. Cl.
*C08F 4/52* (2006.01)
*C08F 4/6192* (2006.01)
*C08F 4/631* (2006.01)
*C08F 4/632* (2006.01)
*C08F 4/6592* (2006.01)

(52) U.S. Cl. ........ 502/104; 502/113; 502/117; 502/125; 502/129; 502/152; 502/153; 502/154; 502/202; 526/132; 526/134; 526/160

(58) Field of Classification Search .................. 502/104, 502/117, 125, 129, 152, 154, 202; 526/132, 526/134, 160
See application file for complete search history.

(56) References Cited

U.S. PATENT DOCUMENTS

| | | | |
|---|---|---|---|
| 3,242,099 A | 3/1966 | Manyik |
| 3,248,179 A | 4/1966 | Norwood |
| 4,501,885 A | 2/1985 | Sherk et al. |
| 4,588,790 A | 5/1986 | Jenking, III et al. |
| 4,794,096 A | 12/1988 | Ewen |
| 4,808,561 A | 2/1989 | Welborn |
| 4,939,217 A | 7/1990 | Stricklen |
| 5,191,132 A | 3/1993 | Patsidis et al. |
| 5,210,352 A | 5/1993 | Alt et al. |
| 5,347,026 A | 9/1994 | Patsidis et al. |
| 5,352,749 A | 10/1994 | DeChellis et al. |
| 5,399,636 A | 3/1995 | Alt et al. |
| 5,401,817 A | 3/1995 | Palackal et al. |
| 5,414,180 A | 5/1995 | Geerts |
| 5,420,320 A | 5/1995 | Zenk et al. |
| 5,436,304 A | 7/1995 | Griffin et al. |
| 5,436,305 A | 7/1995 | Alt et al. |
| 5,451,649 A | 9/1995 | Zenk et al. |
| 5,455,314 A | 10/1995 | Burns et al. |
| 5,480,848 A | 1/1996 | Geerts |
| 5,480,948 A | 1/1996 | Geerts |
| 5,496,781 A | 3/1996 | Geerts |
| 5,498,581 A | 3/1996 | Welch et al. |
| 5,541,272 A | 7/1996 | Schmid et al. |
| 5,554,795 A | 9/1996 | Frey et al. |
| 5,563,284 A | 10/1996 | Frey et al. |
| 5,565,175 A | 10/1996 | Hottovy et al. |
| 5,565,592 A | 10/1996 | Patsidis |
| 5,571,880 A | 11/1996 | Alt et al. |
| 5,575,979 A | 11/1996 | Hanson |
| 5,576,259 A | 11/1996 | Hasegawa |
| 5,594,078 A | 1/1997 | Welch et al. |
| 5,631,203 A | 5/1997 | Welch et al. |
| 5,631,335 A | 5/1997 | Alt et al. |
| 5,654,454 A | 8/1997 | Peifer et al. |
| 5,668,230 A | 9/1997 | Schertl et al. |
| 5,670,589 A | 9/1997 | Geerts |
| 5,705,578 A | 1/1998 | Peifer et al. |
| 5,705,579 A | 1/1998 | Hawley et al. |
| 5,807,938 A | 9/1998 | Kaneko |
| 5,919,983 A | 7/1999 | Rosen |
| 6,005,061 A | 12/1999 | Geerts |
| 6,107,230 A | 8/2000 | McDaniel et al. |
| 6,165,929 A | 12/2000 | McDaniel et al. |
| 6,239,235 B1 | 5/2001 | Hottovy et al. |
| 6,262,191 B1 | 7/2001 | Hottovy et al. |
| 6,294,494 B1 | 9/2001 | McDaniel et al. |
| 6,300,271 B1 | 10/2001 | McDaniel et al. |
| 6,316,553 B1 | 11/2001 | McDaniel et al. |
| 6,355,594 B1 | 3/2002 | McDaniel et al. |
| 6,376,415 B1 | 4/2002 | McDaniel et al. |
| 6,391,816 B1 | 5/2002 | McDaniel et al. |
| 6,395,666 B1 | 5/2002 | McDaniel et al. |
| 6,444,764 B1 * | 9/2002 | Kristen et al. ................ 526/131 |
| 6,482,902 B1 | 11/2002 | Bohnen et al. |
| 6,486,277 B1 | 11/2002 | Erker et al. |
| 6,524,987 B1 | 2/2003 | Collins et al. |
| 6,548,441 B1 | 4/2003 | McDaniel et al. |
| 6,576,723 B1 | 6/2003 | Bohnen et al. |
| 6,833,415 B2 | 12/2004 | Kendrick et al. |
| 6,953,829 B2 | 10/2005 | Kratzer et al. |
| 2005/0288178 A1* | 12/2005 | Jensen et al. .................. 502/117 |

FOREIGN PATENT DOCUMENTS

| | | |
|---|---|---|
| EP | 01059299 | 12/2003 |
| WO | WO00/20466 | 4/2000 |
| WO | WO 2004/007570 | * 1/2004 |
| WO | WO2004/007570 A3 | 1/2004 |

OTHER PUBLICATIONS

Cole et al., "Boroxide Complexes of the Group 4 Metals: A "Noninnocent" Ligand in Olefin Polymerization," Organometallics, 2005, vol. 24, No. 13, pp. 3279-3289. Ishihara et al., "Arylboron Compounds as Acid Catalysts in Organic Synthetic Transformations," Eur. J. of Org. Chem, 1999, pp. 527-538.

Koppl, A. et al., "Heterogeneous Metallocene Catalysts for Ethylene Polymerization," *Journal of Molecular Catalysis A: Chemical*, 2001, vol. 165, pp. 23-32.

Kajigaeshi, S. et al., "Selective Preparation of Fluorene Derivatives Using the *t*-Butyl Function as a Positional Protective Group," *Bull. Chem. Soc. Jpn.*, 1986, vol. 59, pp. 97-103.

Alt, H. et al., $C_1$-verbrückte Fluorenyliden-Indenylidenkomplexe des Typs $(C_{13}H_8\text{-}CR_2\text{-}C_9H_{6-n}R_n)ZrCl_2$ (n=0, 1; R=Me, Ph, Butenyl; R'=Alkyl, Alkenyl) als Metallocenkatalysatorvorstufen für die Ethylenpolymerisation, *Journal of Organometallic Chemistry*, 1998, vol. 562, pp. 153-181.

(Continued)

*Primary Examiner* — Roberto Rabago

(74) *Attorney, Agent, or Firm* — Merchant & Gould P.C.

(57) ABSTRACT

This invention relates to the field of olefin polymerization catalyst compositions, and methods for the polymerization and copolymerization of olefins, typically using a supported catalyst composition. In one aspect, this invention encompasses precontacting a metallocene with a borinic acid or boronic acid prior to contacting this mixture with the acidic activator-support and an organoaluminum compound.

29 Claims, No Drawings

OTHER PUBLICATIONS

Alt, H. et al., "$C_1$-Bridged Fluorenylidene Cyclopentadienylidene Complexes of the type ($C_{13}$-$H_8$-$CR^1R^2$-$C_5H_3R$)$ZrCl_2$ ($R^1$, $R^2$=alkyl, phenyl, alkenyl; R=H, alkyl, alkenyl, substituted silyl) as Catalyst Precursors for the Polymerization of Ethylene and Propylene," *Journal of Organometallic Chemistry*, 1998, vol. 568 pp. 87-112.

Alt, H. et al., "Syndiospezifische Polymerisation von Propylen: 2- und 2, 7-substituierte Metallocenkomplex des Typs ($C_{13}H_{8-n}R_nCR'_2C_5H_4$) $MCl_2$(n=1, 2; R=Alkoxy, Alkyl, Aryl, Hal; R'=Me, Ph; M=Zr, Hf)," *Journal of Organometallic Chemistry*, 1996, vol. 522, pp. 39-54.

Cotton et al., Advanced Inorganic Chemistry, 6th Ed., Wiley-Interscience, 1999, 4 pages.

Hawley's Condensed Chemical Dictionary, 11th Ed., John Wiley & Sons, 1995, 3 pages.

* cited by examiner

CATALYSTS FOR OLEFIN POLYMERIZATION

TECHNICAL FIELD OF THE INVENTION

This invention relates to the field of olefin polymerization catalyst compositions, methods for the polymerization of olefins, and olefin polymers.

BACKGROUND OF THE INVENTION

Mono-1-olefins (α-olefins), including ethylene, can be polymerized with catalyst compositions employing titanium, zirconium, vanadium, chromium or other metals, impregnated on a variety of support materials, often in the presence of cocatalysts. These catalyst compositions may be useful for both homopolymerization of ethylene, as well as copolymerization of ethylene with comonomers such as propylene, 1-butene, 1-hexene, or other higher α-olefins. Therefore, there exists a constant search to develop new olefin polymerization catalysts, catalyst activation processes, and methods of making and using catalysts that will provide enhanced catalytic activities and polymeric materials tailored to specific end uses.

One type of catalyst system consists of metallocene compounds contacted with methyl aluminoxane to form a polymerization catalyst. However, in order to achieve the desired high polymerization activities, large amounts of expensive methyl aluminoxane are necessary to form the active metallocene catalysts. This feature has been an impediment to the commercialization of metallocene catalyst systems. Therefore improvements in catalyst compositions and in methods of making the catalyst are needed to afford the desired high polymerization activities at reasonable commercial costs.

SUMMARY OF THE INVENTION

This invention comprises catalyst compositions, methods for preparing catalyst compositions, and methods for polymerizing olefins using the catalyst compositions. In the course of examining metallocene olefin polymerization catalysts, it was discovered that increased activity in metallocene catalyst compositions could be achieved by precontacting the metallocene compound with a borinic acid or boronic acid for some period of time before the mixture is contacted with an acidic activator-support and an organoaluminum cocatalyst.

The mixture of at least one metallocene and at least one borinic acid or boronic acid, before it is contacted with the activator-support, is termed the "precontacted" mixture. The mixture of metallocene, borinic acid or boronic acid, activator-support, and organoaluminum cocatalyst compound, formed from contacting the precontacted mixture with the acidic activator-support and an organoaluminum cocatalyst compound, is termed the "postcontacted" mixture. This terminology is used regardless of what type of reaction occurs between components of the mixtures. For example, according to this description, it is possible for the precontacted borinic acid or boronic acid, once it is admixed with the metallocene or metallocenes, to have a different chemical formulation and structure from the distinct borinic acid or boronic acid used to prepare the precontacted mixture. Accordingly, the metallocene, the borinic acid or boronic acid, the acidic activator-support, and the organoaluminum compound, whether precontacted or postcontacted, are described according to the corresponding metallocene, borinic acid or boronic acid, acidic activator-support and the organoaluminum compound used to contact the other components in preparing the precontacted or postcontacted mixtures.

Therefore, in one aspect, the catalyst composition of this invention comprises: at least one precontacted metallocene; at least one precontacted borinic acid or boronic acid; and at least one postcontacted acidic activator-support and at least one postcontacted organoaluminum compound.

In another aspect, the precontacted metallocene comprises a compound having the following formula:

$$(X^1)(X^2)(X^3)(X^4)M^1,$$

wherein $M^1$ is titanium, zirconium, or hafnium;

wherein $(X^1)$ is independently a cyclopentadienyl, indenyl, fluorenyl, boratabenzene, substituted cyclopentadienyl, substituted indenyl, substituted fluorenyl, or substituted boratabenzene;

wherein each substituent on the substituted cyclopentadienyl, substituted indenyl, substituted fluorenyl or substituted boratabenzene of $(X^1)$ is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms, a halide, or hydrogen;

wherein at least one substituent on $(X^1)$ is optionally a bridging group that connects $(X^1)$ and $(X^2)$;

wherein $(X^2)$ is independently a cyclopentadienyl group, an indenyl group, a fluorenyl group, a boratabenzene group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms, or a halide;

wherein each substituent on the substituted $(X^2)$ is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms, a halide, or hydrogen;

wherein at least one substituent on $(X^2)$ is optionally a bridging group that connects $(X^1)$ and $(X^2)$; and wherein $(X^3)$ and $(X^4)$ are independently an aliphatic group, an aromatic group, a cyclic group, a combination of aliphatic and cyclic groups, an organometallic group, or a substituted derivative thereof, any one of which having from 1 to about 20 carbon atoms.

In still another aspect of the invention, the precontacted borinic acid comprises a compound having the following formula:

wherein R is independently: an aliphatic group, an aromatic group, a substituted aromatic group, a cyclic group, or any combination thereof; or the precontacted boronic acid comprises a compound having the following formula:

wherein R is independently: an aromatic group, a substituted aromatic group, or any combination thereof.

Yet another aspect of this invention is the postcontacted acidic activator-support which comprises a solid oxide treated with an electron-withdrawing anion, wherein:

the solid oxide is a silica, alumina, silica-alumina, aluminum phosphate, heteropolytungstates, titania, zirconia, magnesia, boria, zinc oxide, mixed oxides thereof, or mixtures thereof, and the electron-withdrawing anion is a fluoride, chloride, bromide, phosphate, triflate, bisulfate, sulfate, or any combination thereof.

In another aspect of this invention, the postcontacted organoaluminum compound comprises an organoaluminum compound with the following formula:

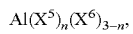

wherein $(X^5)$ is a hydrocarbyl having from 2 to about 20 carbon atoms; $(X^6)$ is an alkoxide or aryloxide, any one of which having from 1 to about 20 carbon atoms, a halide, or hydride; and n is a number from 1 to 3, inclusive.

In one aspect of this invention, for example, the metallocene compound comprises a zirconium metallocene such as bis(cyclopentadienyl)zirconium dimethyl ($Cp_2ZrMe_2$), or methyl-3-butenylmethylidene($\eta^5$-cyclopentadienyl)($\eta^5$-9-fluorenyl)zirconium dimethyl), which is employed along with borinic acid or boronic acid, fluoride-treated silica-alumina acidic activator-support and a triisobutylaluminum cocatalyst. The activator-support of this invention, of which fluorided silica-alumina is one example, exhibits enhanced acidity as compared to the corresponding untreated solid oxide compound. The activator-support also functions as a catalyst activator as compared to the corresponding untreated solid oxide. Accordingly, the acidic activator-support functions as an "activator" because it is not merely an inert support component of the catalyst composition, but is involved in effecting the observed catalytic chemistry.

In another aspect of this invention, for example, precontacting a metallocene compound with borinic acid or boronic acid, typically for at least about 1 minute, prior to contacting this mixture with the acidic activator-support such as fluorided silica-alumina and a trialkyaluminum, the productivity of the subsequent olefin polymerization was increased. The enhanced activity catalyst composition of this invention can be used for homopolymerization of an α-olefin monomer, and for copolymerization of an α-olefin and a comonomer.

This invention also comprises methods of making catalyst compositions that utilize at least one metallocene catalyst, at least one borinic acid or boronic acid, at least one acidic activator-support and at least one organoaluminum compound. The methods of this invention comprise precontacting the metallocene catalyst and a borinic acid or boronic acid prior to contacting this precontacted mixture with the acidic activator-support and an organoaluminum cocatalyst. Such methods allow for, among other things, attaining a high polymerization activity and productivity.

Thus, in one aspect, this invention provides a process to produce a catalyst composition, comprising:

contacting at least one metallocene, at least one borinic acid or boronic acid for a first period of time to form a precontacted mixture comprising at least one precontacted metallocene and at least one precontacted borinic acid or boronic acid; and contacting the precontacted mixture with at least one acidic activator-support and at least one trialkylaluminum for a second period of time to form a postcontacted mixture comprising at least one postcontacted metallocene, at least one postcontacted borinic acid or boronic acid, at least one postcontacted acidic activator-support and at least one postcontacted organoaluminum compound.

The present invention further comprises new catalyst compositions, methods for preparing catalyst compositions, and methods for polymerizing olefins that result in improved productivity, without the need for using large excess concentrations of expensive organoaluminum cocatalysts.

Additionally, this invention encompasses a process comprising contacting at least one monomer and the postcontacted catalyst composition under polymerization conditions to produce the polymer. Thus, this invention comprises methods for polymerizing olefins using the catalyst compositions prepared as described herein.

This invention also comprises an article that comprises the polymer produced with the catalyst composition of this invention.

These and other features, aspects, embodiments, and advantages of the present invention will become apparent after a review of the following detailed description of the disclosed features.

DETAILED DESCRIPTION OF THE INVENTION

The present invention provides new catalyst compositions, methods for preparing catalyst compositions, and methods for using the catalyst compositions to polymerize olefins. In one aspect, the catalyst composition of this invention comprises: at least one precontacted metallocene; at least one precontacted borinic acid or boronic acid; at least one postcontacted acidic activator-support; and at least one postcontacted organoaluminum compound.

In yet another aspect, the present invention provides a catalyst composition comprising an optional cocatalyst in addition to the precontacted metallocene, precontacted borinic acid or boronic acid, postcontacted acidic activator-support and postcontacted organoaluminum compound. In one aspect, the optional cocatalyst may be at least one aluminoxane, at least one organoboron compound, at least one ionizing ionic compound, or any combination thereof. In another aspect, the optional cocatalyst may be used in the precontacting step, in the postcontacting step, or in both steps. Further, any combination of cocatalysts may be used in either step, or in both steps.

In still another aspect, this invention provides a process to produce a catalyst composition, comprising:

contacting a metallocene, and a borinic acid or boronic acid compound, for a first period of time to form a precontacted mixture comprising a precontacted metallocene, and precontacted borinic acid or boronic acid; and contacting the precontacted mixture with an acidic activator-support and an organoaluminum for a second period of time to form a postcontacted mixture comprising a postcontacted metallocene, a postcontacted, a postcontacted borinic acid or boronic acid, a postcontacted acidic activator-support and a postcontacted organoaluminum compound.

Catalyst Compositions and Components

The Metallocene Compound

The present invention provides catalyst compositions comprising at least one metallocene compound, at least one borinic acid or boronic acid, at least one acidic activator-support and at least one organoaluminum compound. In one aspect, the metallocene compound and the borinic acid or boronic acid are precontacted to form a precontacted mixture, prior to contacting this precontacted mixture with the acidic activator-support and the organoaluminum compound. The metallocene compound may comprise a metallocene compound of titanium, zirconium, and hafnium.

In one aspect, the metallocene compound that is used to prepare the precontacted mixture, comprises a compound having the following formula:

$$(X^1)(X^2)(X^3)(X^4)M^1,$$

wherein $M^1$ is titanium, zirconium, or hafnium;

wherein $(X^1)$ is independently a cyclopentadienyl, indenyl, fluorenyl, boratabenzene, substituted cyclopentadienyl, substituted indenyl, substituted fluorenyl, or substituted boratabenzene;

wherein each substituent on the substituted cyclopentadienyl, substituted indenyl, substituted fluorenyl or substituted boratabenzene of $(X^1)$ is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms, a halide, or hydrogen;

wherein at least one substituent on $(X^1)$ is optionally a bridging group that connects $(X^1)$ and $(X^2)$;

wherein $(X^2)$ is independently a cyclopentadienyl group, an indenyl group, a fluorenyl group, a boratabenzene group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms, or a halide;

wherein each substituent on the substituted $(X^2)$ is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms, a halide, or hydrogen;

wherein at least one substituent on $(X^2)$ is optionally a bridging group that connects $(X^1)$ and $(X^2)$; and wherein $(X^3)$ and $(X^4)$ are independently an aliphatic group, an aromatic group, a cyclic group, a combination of aliphatic and cyclic groups, an organometallic group, or a substituted derivative thereof, any one of which having from 1 to about 20 carbon atoms.

In one aspect, the following groups may be independently substituents on $(X^1)$ and $(X^2)$: an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide; as long as these groups do not terminate the activity of the catalyst composition. This list includes substituents that may be characterized in more than one of these categories such as benzyl. Further, hydrogen may be a substituent on $(X^1)$ and $(X^2)$, as long as this group does not terminate the activity of the catalyst composition, therefore the notion of a substituted indenyl and substituted fluorenyl includes partially saturated indenyls and fluorenyls including, but not limited to, tetrahydroindenyls, tetrahydrofluorenyls, and octahydrofluorenyls.

Examples of each of these groups include, but are not limited to, the following groups. In each example presented below, unless otherwise specified, R is independently: an aliphatic group; an aromatic group; a cyclic group; any combination thereof, any substituted derivative thereof, including but not limited to, a halide-, an alkoxide-, or an amide-substituted derivative thereof, any one of which has from 1 to about 20 carbon atoms; or hydrogen. Also included in these groups are any unsubstituted, branched, or linear analogs thereof.

Examples of aliphatic groups, in each instance, include, but are not limited to, an alkyl group, a cycloalkyl group, an alkenyl group, a cycloalkenyl group, an alkynyl group, an alkadienyl group, a cyclic aliphatic group, and the like, and includes all substituted, unsubstituted, branched, and linear analogs or derivatives thereof, in each instance having from one to about 20 carbon atoms. Thus, aliphatic groups include, but are not limited to, hydrocarbyls such as paraffins and alkenyls. For example, aliphatic groups as used herein include methyl, ethyl, propyl, n-butyl, tert-butyl, sec-butyl, isobutyl, amyl, isoamyl, hexyl, cyclohexyl, heptyl, octyl, nonyl, decyl, dodecyl, 2-ethylhexyl, pentenyl, butenyl, and the like.

Examples of aromatic groups, in each instance, include, but are not limited to, phenyl, naphthyl, anthacenyl, and the like, including substituted derivatives thereof, in each instance having from 6 to about 25 carbons. Substituted derivatives of aromatic compounds include, but are not limited to, tolyl, xylyl, mesityl, pentafluorophenyl, and the like, including any heteroatom substituted derivative thereof.

Examples of cyclic groups, in each instance, include, but are not limited to, cycloparaffins, cycloolefins, cycloalkynes, aryl groups such as phenyl, bicyclic groups and the like, including substituted derivatives thereof, in each instance having from about 3 to about 20 carbon atoms. Thus heteroatom-substituted cyclic groups such as furanyl are included herein. Also included herein are cyclic hydrocarbyl groups such as aryl, cycloalkyl, cycloalkenyl, cycloalkadienyl, aralkyl, aralkenyl, aralkynyl, and the like.

In each instance, aliphatic and cyclic groups are groups comprising an aliphatic portion and a cyclic portion, examples of which include, but are not limited to, groups such as: $-(CH_2)_m C_6 H_q R_{5-q}$ wherein m is an integer from 1 to about 10, q is an integer from 1 to 5, inclusive; $-(CH_2)_m C_6 H_q R_{11-q}$ wherein m is an integer from 1 to about 10, q is an integer from 1 to 11, inclusive; and $(CH_2)_m C_5 H_q R_{9-q}$ wherein m is an integer from 1 to about 10, q is an integer from 1 to 9, inclusive. In each instance and as defined above, R is independently: an aliphatic group; an aromatic group; a cyclic group; any combination thereof, any substituted derivative thereof, including but not limited to, a halide-, an alkoxide-, or an amide-substituted derivative thereof, any one of which has from 1 to about 20 carbon atoms; or hydrogen. In one aspect, aliphatic and cyclic groups include, but are not limited to: $-CH_2C_6H_5$; $-CH_2C_6H_4F$; $-CH_2C_6H_4Cl$; $-CH_2C_6H_4Br$; $-CH_2C_6H_4I$; $-CH_2C_6H_4OMe$; $-CH_2C_6H_4OEt$; $-CH_2C_6H_4NH_2$; $-CH_2C_6H_4NMe_2$; $-CH_2C_6H_4NEt_2$; $-CH_2CH_2C_6H_5$; $-CH_2CH_2C_6H_4F$; $-CH_2CH_2C_6H_4Cl$; $-CH_2CH_2C_6H_4Br$; $-CH_2CH_2C_6H_4I$; $-CH_2CH_2C_6H_4OMe$; $-CH_2CH_2C_6H_4OEt$; $-CH_2CH_2C_6H_4NH_2$; $-CH_2CH_2C_6H_4NMe_2$; $-CH_2CH_2C_6H_4NEt_2$; any regioisomer thereof, and any substituted derivative thereof.

Examples of halides, in each instance, include fluoride, chloride, bromide, and iodide.

In each instance, oxygen groups are oxygen-containing groups, examples of which include, but are not limited to, alkoxy or aryloxy groups (—OR), —OC(O)R, —OC(O)H, —OSiR$_3$, —OPR$_2$, —OAlR$_2$, and the like, including substituted derivatives thereof, wherein R in each instance is an alkyl, cycloalkyl, aryl, aralkyl, substituted alkyl, substituted aryl, or substituted aralkyl having from 1 to about 20 carbon atoms. Examples of alkoxy or aryloxy groups (—OR) groups include, but are not limited to, methoxy, ethoxy, propoxy, butoxy, phenoxy, substituted phenoxy, and the like.

In each instance, sulfur groups are sulfur-containing groups, examples of which include, but are not limited to, —SR, and the like, including substituted derivatives thereof, wherein R in each instance is an alkyl, cycloalkyl, aryl, aralkyl, substituted alkyl, substituted aryl, or substituted aralkyl having from 1 to about 20 carbon atoms.

In each instance, nitrogen groups are nitrogen-containing groups, which include, but are not limited to —NR$_2$, or pyridyl, and the like, including substituted derivatives thereof, wherein R in each instance is an alkyl, cycloalkyl, aryl, aralkyl, substituted alkyl, substituted aryl, or substituted aralkyl having from 1 to about 20 carbon atoms.

In each instance, phosphorus groups are phosphorus-containing groups, which include, but are not limited to, —PR$_2$, and the like, including substituted derivatives thereof, wherein R in each instance is an alkyl, cycloalkyl, aryl, aralkyl, substituted alkyl, substituted aryl, or substituted aralkyl having from 1 to about 20 carbon atoms.

In each instance, arsenic groups are arsenic-containing groups, which include, but are not limited to, —AsR$_2$, and the like, including substituted derivatives thereof, wherein R in each instance is an alkyl, cycloalkyl, aryl, aralkyl, substituted alkyl, substituted aryl, or substituted aralkyl having from 1 to about 20 carbon atoms.

In each instance, carbon groups are carbon-containing groups, which include, but are not limited to, alkyl halide groups that comprise halide-substituted alkyl groups with 1 to about 20 carbon atoms, aralkyl groups with 1 to about 20 carbon atoms, including substituted derivatives thereof, wherein R in each instance is an alkyl, cycloalkyl, aryl, aralkyl, substituted alkyl, substituted aryl, or substituted aralkyl having from 1 to about 20 carbon atoms.

In each instance, silicon groups are silicon-containing groups, which include, but are not limited to, silyl groups such alkylsilyl groups, arylsilyl groups, arylalkylsilyl groups, siloxy groups, and the like, which in each instance have from 1 to about 20 carbon atoms. For example, silicon groups include trimethylsilyl and phenyloctylsilyl groups.

In each instance, germanium groups are germanium-containing groups, which include, but are not limited to, germyl groups such alkylgermyl groups, arylgermyl groups, arylalkylgermyl groups, germyloxy groups, and the like, which in each instance have from 1 to about 20 carbon atoms.

In each instance, tin groups are tin-containing groups, which include, but are not limited to, stannyl groups such alkylstannyl groups, arylstannyl groups, arylalkylstannyl groups, stannoxy (or "stannyloxy") groups, and the like, which in each instance have from 1 to about 20 carbon atoms. Thus, tin groups include, but are not limited to, stannoxy groups.

In each instance, boron groups are boron-containing groups, which include, but are not limited to, —BR$_2$, —BX$_2$, —BRX, wherein X is a monoanionic group such as halide, hydride, alkoxide, alkyl thiolate, and the like, and wherein R in each instance is an alkyl, cycloalkyl, aryl, aralkyl, substituted alkyl, substituted aryl, or substituted aralkyl having from 1 to about 20 carbon atoms.

Examples of organometallic groups that may be used as substituents for substituted cyclopentadienyls, substituted indenyls, and substituted fluorenyls, in each instance, include, but are not limited to, organoboron groups, organoaluminum groups, organogallium groups, organosilicon groups, organogermanium groups, organotin groups, organolead groups, organo-transition metal groups, and the like, having from 1 to about 20 carbon atoms.

In one aspect of this invention, ($X^3$) and ($X^4$) are hydrocarbyls having from 1 to about 20 carbon atoms. More typically, ($X^3$) and ($X^4$) are methyl, pheny, benzyl, or substituted derivatives thereof.

In another aspect, because of the selections possible for ($X^1$) and ($X^2$), the metallocene of this invention can comprise a monokis(cyclopentadienyl) compound, a bis(cyclopentadienyl) compound, a monokis(indenyl) compound, a bis(indenyl) compound, a monokis(fluorenyl) compound, a bis(fluorenyl) compound, a (cyclopentadienyl)(indenyl) compound, a (cyclopentadienyl)(fluorenyl) compound, an (indenyl)(fluorenyl) compound, substituted analogs thereof, bridged analogs thereof, and the like. Thus, at least one substituent on ($X^2$) is optionally a bridging group that connects ($X^1$) and ($X^2$).

In one aspect of the invention, ($X^1$) is independently a cyclopentadienyl, indenyl, fluorenyl, boratabenzene, substituted cyclopentadienyl, substituted indenyl, substituted fluorenyl, or substituted boratabenzene; and ($X^2$) is independently a cyclopentadienyl group, an indenyl group, a fluorenyl group, a boratabenzene group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide; as long as these groups do not terminate the activity of the catalyst composition.

At least one substituent on ($X^1$) or ($X^2$) may optionally be a bridging group that connects or bridges the ($X^1$) and ($X^2$) ligands, as long as the bridging group does not terminate the activity of the catalyst composition. The linkage that connects ($X^1$) and ($X^2$), that is, the shortest link of the bridging moiety, can be a single atom such as carbon, silicon, germanium, or tin atom. In one aspect, the bridging atom is a carbon or silicon atom, in which case the bridge comprises a substituted methylene (or methylidene) group or a substituted silylene group. In another aspect, the linkage that connects ($X^1$) and ($X^2$), that is, the shortest link of the bridging moiety, can be from 2 to about 4 atoms. In yet another aspect, the linkage that connects ($X^1$) and ($X^2$), that is, the shortest link of the bridging moiety, can comprise from 2 to about 4 carbon atoms.

In another aspect, examples of bridging groups include, but are not limited to, aliphatic groups, cyclic groups, combinations of aliphatic groups and cyclic groups, phosphorous groups, nitrogen groups, organometallic groups, silicon, phosphorus, boron, germanium, and the like. Examples of aliphatic groups that can serve as bridges between ($X^1$) and ($X^2$) include, but are not limited to, hydrocarbyls, such as paraffins and olefins. Examples of cyclic groups that can serve as bridges between ($X^1$) and ($X^2$) include, but are not limited to, cycloparaffins, cycloolefins, cycloalkynes, arenes, and the like. Examples of organometallic groups that can serve as bridges between ($X^1$) and ($X^2$) include, but are not limited to, substituted silyl derivatives, substituted tin groups, substituted germanium groups, substituted boron groups, and the like.

In another aspect, the optional bridging group may be substituted by at least one substituent, wherein the substituent may be independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen.

Numerous processes to prepare organometal compounds that can be employed in this invention, particularly metallocenes, have been reported. For example, U.S. Pat. Nos. 4,939,217, 5,210,352, 5,436,305, 5,401,817, 5,631,335, 5,571,880, 5,191,132, 5,399,636, 5,565,592, 5,347,026, 5,594,078, 5,498,581, 5,496,781, 5,563,284, 5,554,795, 5,420,320, 5,451,649, 5,541,272, 5,705,578, 5,631,203, 5,654,454, 5,705,579, and 5,668,230 describe such methods, each of which is incorporated by reference herein, in its entirety. Other processes to prepare metallocene compounds that can be employed in this invention have been reported in references such as: Köppl, A. Alt, H. G. *J. Mol. Catal. A.* 2001, 165, 23; Kajigaeshi, S.; Kadowaki, T.; Nishida, A.; Fujisaki, S. *The Chemical Society of Japan,* 1986, 59, 97; Alt, H. G.; Jung, M.; Kehr, G. *J. Organomet. Chem.* 1998, 562, 153-181; and Alt, H. G.; Jung, M. *J. Organomet. Chem.* 1998, 568, 87-112; each of which is incorporated by reference herein, in its entirety. Further, additional processes to prepare metallocene compounds that can be employed in this invention have been reported in: *Journal of Organometallic Chemistry,* 1996, 522, 39-54, which is incorporated by reference herein, in its entirety. The following treatises also describe such methods: Wailes, P. C.; Coutts, R. S. P.; Weigold, H. in Organometallic Chemistry of Titanium, Zirconium, and Hafnium, Academic; New York, 1974.; Cardin, D. J.; Lappert, M. F.; and Raston, C. L.; Chemistry of Organo-Zirconium and -Hafnium Compounds; Halstead Press; New York, 1986; each of which is incorporated by reference herein, in its entirety.

In one aspect of this invention, the metallocene compounds of the present invention include, but are not limited to the following compounds:

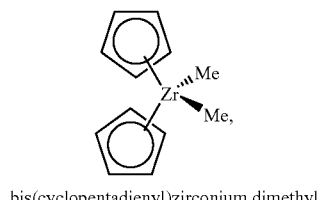

bis(cyclopentadienyl)zirconium dimethyl

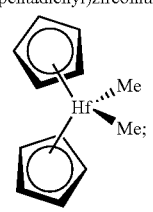

bis(cyclopentadienyl)hafnium dimethyl,

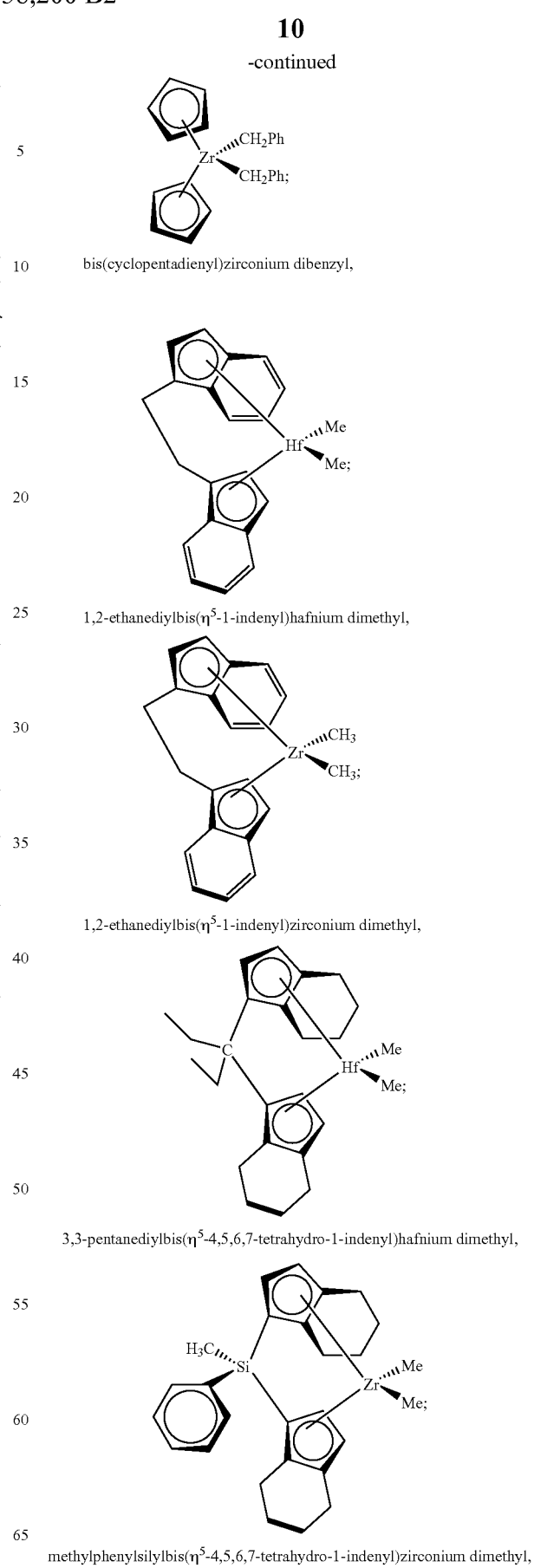

bis(cyclopentadienyl)zirconium dibenzyl, 1,2-ethanediylbis($\eta^5$-1-indenyl)hafnium dimethyl, 1,2-ethanediylbis($\eta^5$-1-indenyl)zirconium dimethyl, 3,3-pentanediylbis($\eta^5$-4,5,6,7-tetrahydro-1-indenyl)hafnium dimethyl, methylphenylsilylbis($\eta^5$-4,5,6,7-tetrahydro-1-indenyl)zirconium dimethyl, -continued

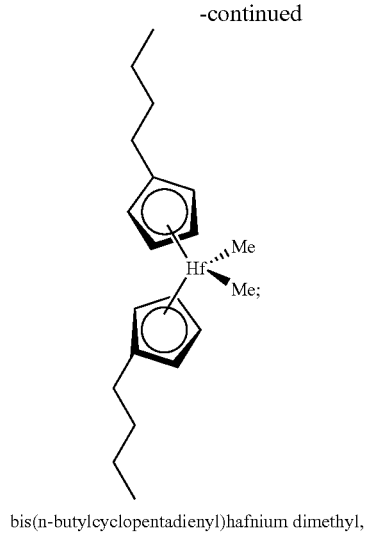

bis(n-butylcyclopentadienyl)hafnium dimethyl,

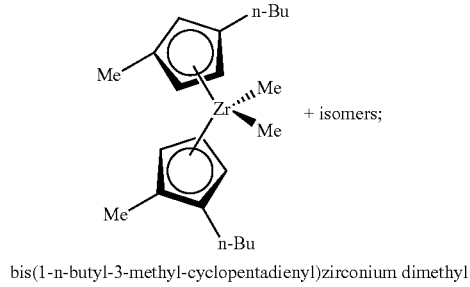 + isomers;

bis(1-n-butyl-3-methyl-cyclopentadienyl)zirconium dimethyl

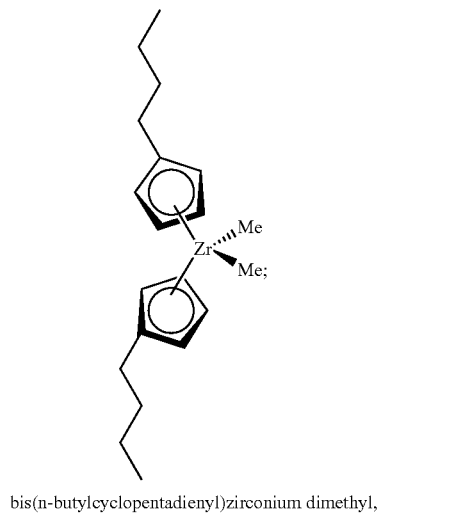

bis(n-butylcyclopentadienyl)zirconium dimethyl,

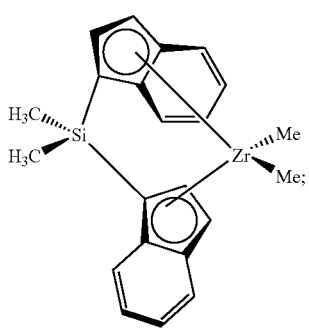

dimethylsilylbis(1-indenyl)zirconium dimethyl,

-continued

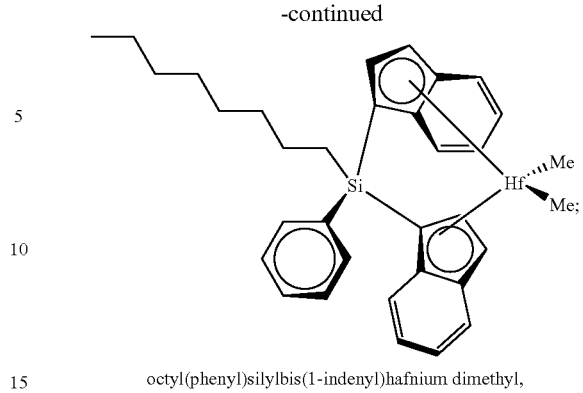

octyl(phenyl)silylbis(1-indenyl)hafnium dimethyl,

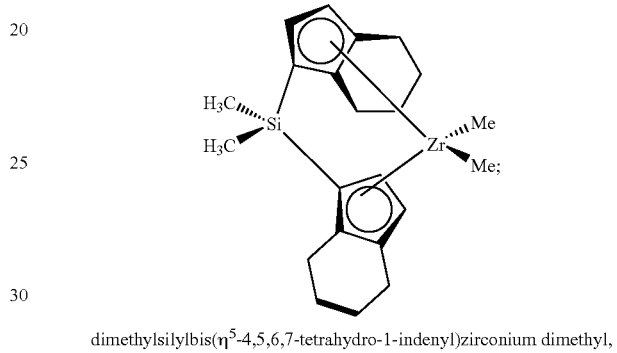

dimethylsilylbis($\eta^5$-4,5,6,7-tetrahydro-1-indenyl)zirconium dimethyl,

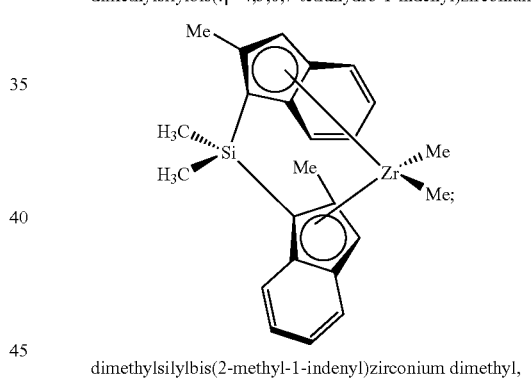

dimethylsilylbis(2-methyl-1-indenyl)zirconium dimethyl,

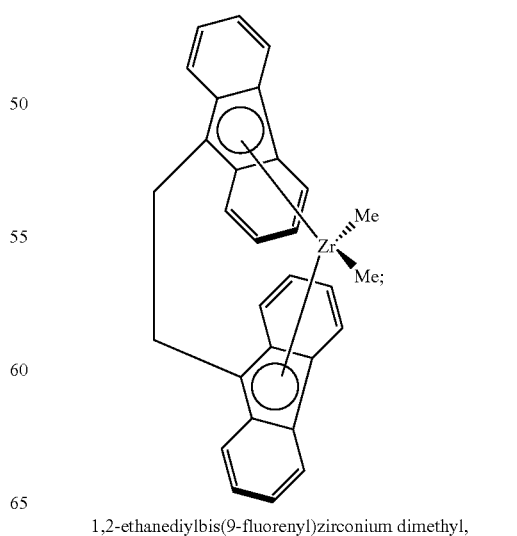

1,2-ethanediylbis(9-fluorenyl)zirconium dimethyl,

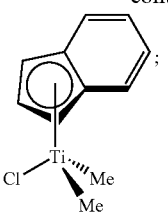

indenyl dimethyl titanium(IV) chloride,

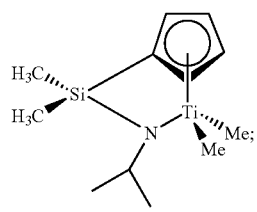

(isopropylamidodimethylsilyl)cyclopentadienyltitanium dimethyl,

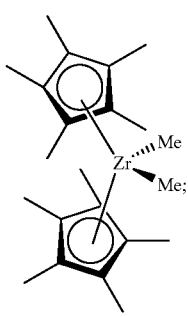

bis(pentamethylcyclopentadienyl)zirconium dimethyl,

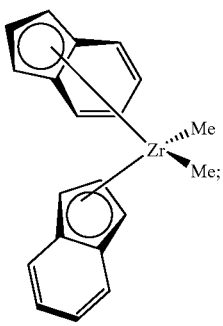

bis(indenyl) zirconium dimethyl,

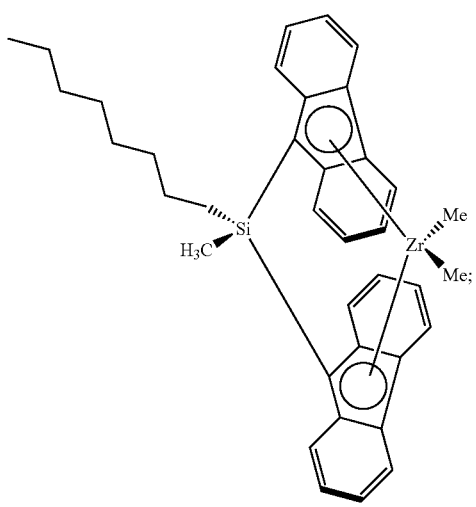

methyl(octyl)silylbis(9-fluorenyl)zirconium dimethyl,

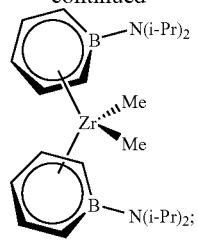

bis-[1-(N,N-diisopropylamino)boratabenzene]zirconium dimethyl, methyl-3-butenylmethylidene($\eta^5$-cyclopentadienyl)($\eta^5$-9-fluorenyl)zirconium dimethyl, [($\eta^5$-C$_5$H$_4$)CCH$_3$(CH$_2$CH$_2$CH=CH$_2$)($\eta^5$-9-C$_{13}$H$_9$)]ZrMe$_2$;
methyl-3-butenylmethylidene($\eta^5$-cyclopentadienyl)($\eta^5$-2,7-di-t-butyl-9-fluorenyl)zirconium dimethyl, [($\eta^5$-C$_5$H$_4$)CCH$_3$(CH$_2$CH$_2$CH=CH$_2$)($\eta^5$-9-C$_{13}$H$_7$-2,7-$^t$Bu$_2$)]ZrMe$_2$;
methyl-4-pentenylmethylidene($\eta^5$-cyclopentadienyl)($\eta^5$-9-fluorenyl)zirconium dimethyl, [($\eta^5$-C$_5$H$_4$)CCH$_3$(CH$_2$CH$_2$CH$_2$CH=CH$_2$)($\eta^5$-9-C$_{13}$H$_9$)]ZrMe$_2$;
methyl-4-pentenylmethylidene($\eta^5$-cyclopentadienyl)($\eta^5$-2,7-di-t-butyl-9-fluorenyl)zirconium dimethyl, [($\eta^5$-C$_5$H$_4$)CCH$_3$(CH$_2$CH$_2$CH$_2$CH=CH$_2$)($\eta^5$-9-C$_{13}$H$_7$-2,7-$^t$Bu$_2$)]ZrMe$_2$;
phenyl-3-butenylmethylidene($\eta^5$-cyclopentadienyl)($\eta^5$-9-fluorenyl)zirconium dimethyl, [($\eta^5$-C$_5$H$_4$)C(C$_6$H$_5$)(CH$_2$CH$_2$CH=CH$_2$)($\eta^5$-9-C$_{13}$H$_9$)]ZrMe$_2$;
phenyl-3-butenylmethylidene($\eta^5$-cyclopentadienyl)($\eta^5$-2,7-di-t-butyl-9-fluorenyl)zirconium dimethyl, [($\eta^5$-C$_5$H$_4$)C(C$_6$H$_5$)(CH$_2$CH$_2$CH=CH$_2$)($\eta^5$-9-C$_{13}$H$_7$-2,7-$^t$Bu$_2$)]ZrMe$_2$;
phenyl-4-pentenylmethylidene($\eta^5$-cyclopentadienyl)($\eta^5$-9-fluorenyl)zirconium dimethyl, [($\eta^5$-C$_5$H$_4$)C(C$_6$H$_5$)(CH$_2$CH$_2$CH$_2$CH=CH$_2$)($\eta^5$-9-C$_{13}$H$_9$)]ZrMe$_2$;
phenyl-4-pentenylmethylidene($\eta^5$-cyclopentadienyl)($\eta^5$-2,7-di-t-butyl-9-fluorenyl)zirconium dimethyl, [($\eta^5$-C$_5$H$_4$)C(C$_6$H$_5$)(CH$_2$CH$_2$CH$_2$CH=CH$_2$)($\eta^5$-9-C$_{13}$H$_7$-2,7-$^t$Bu$_2$)]ZrCMe$_2$;
and the like.

Typically, the organometal compound comprises bis(cyclopentadienyl)zirconium dimethyl; bis(indenyl)zirconium dibenzyl; dimethylsilylbis(1-indenyl)zirconium dimethyl; methyloctylsilylbis(9-fluorenyl)zirconium dimethyl; or bis(2,7-di-tert-butylfluorenyl)-ethan-1,2-diyl)zirconium(IV) dimethyl.

The Borinic Acid or Boronic Acid Compound

In one aspect, the present invention provides catalyst compositions comprising at least one metallocene compound, at least one borinic acid or boronic acid, at least one acidic activator-support and at least one organoaluminum compound. In another one aspect, the metallocene compound is precontacted with the borinic acid or boronic acid to form a precontacted mixture, prior to contacting this precontacted mixture with the acidic activator-support and the organoaluminum compound.

In another aspect, the borinic acid comprises a compound having the following formula:

$$R_2B(OH)$$

wherein R is independently: an aliphatic group, an aromatic group, a substituted aromatic group, a cyclic group, or a combination thereof wherein at least one R is an aromatic group or a substituted aromatic group; or the boronic acid comprises a compound having the following formula:

wherein R is: an aromatic group, or a substituted aromatic group.

In yet another aspect, R is an aryl group having from 1 to about 20 carbon atoms, and in another aspect, R is methyl, phenyl, pentafluorophenyl, mesityl and the like.

The Solid Acidic Activator-Support

The present invention provides catalyst compositions comprising at least one metallocene compound, at least one borinic acid or boronic acid, and at least one acidic activator-support, and at least one organoaluminum compound. In one aspect, the metallocene compound is precontacted with the borinic acid or boronic acid to form a precontacted mixture, prior to contacting this precontacted mixture with the acidic activator-support and the organoaluminum compound.

The present invention encompasses catalyst compositions comprising an acidic activator-support, methods for preparing catalyst compositions comprising an acidic activator-support, and methods for polymerizing olefins using these catalyst compositions. In this invention, the metallocene compound may be contacted with a borinic acid or boronic acid for a first period of time prior to contacting this mixture with the acidic activator-support and an organoaluminum compound. Once the precontacted mixture of metallocene and borinic acid or boronic acid has been contacted with the acidic activator-support and the organoaluminum compound, this composition which further comprises the acidic activator-support and the organoaluminum compound is termed the "postcontacted" mixture. In one aspect, the postcontacted mixture may be further allowed to remain in contact for a second period of time prior to being charged into the reactor in which the polymerization process will be carried out. In another aspect, the postcontacted mixture may be charged into the reactor immediately after being prepared, or may be prepared directly in the reactor, and the polymerization reaction initiated immediately thereafter. In this aspect, the second period of time during which the postcontacted mixture is allowed to remain in contact is the minimal amount of time required to prepare the postcontacted mixture and initiate the polymerization process.

In one aspect, the present invention encompasses catalyst compositions comprising a chemically-treated solid oxide which serves as an acidic activator-support, and which is typically used in combination with an organoaluminum compound. In another aspect, the activator-support comprises at least one solid oxide treated with at least one electron-withdrawing anion; wherein the solid oxide is silica, alumina, silica-alumina, aluminum phosphate, heteropolytungstates, titania, zirconia, magnesia, boria, zinc oxide, mixed oxides thereof, or mixtures thereof, and wherein the electron-withdrawing anion is fluoride, chloride, bromide, phosphate, triflate, bisulfate, sulfate, or any combination thereof.

The activator-support includes the contact product of at least one solid oxide compound and at least one electron-withdrawing anion source. In one aspect, the solid oxide compound comprises an inorganic oxide. It is not required that the solid oxide compound be calcined prior to contacting the electron-withdrawing anion source. The contact product may be calcined either during or after the solid oxide compound is contacted with the electron-withdrawing anion source. In this aspect, the solid oxide compound may be calcined or uncalcined. In another aspect, the activator-support may comprise the contact product of at least one calcined solid oxide compound and at least one electron-withdrawing anion source.

The activator-support exhibits enhanced acidity as compared to the corresponding untreated solid oxide compound. The activator-support also functions as a catalyst activator as compared to the corresponding untreated solid oxide. While not intending to be bound by theory, it is believed that the activator-support may function as an ionizing solid oxide compound by completely or partially extracting an anionic ligand from the metallocene. However, the activator-support is an activator regardless of whether it is ionizes the metallocene, abstracts an anionic ligand to form an ion pair, weakens the metal-ligand bond in the metallocene, simply coordinates to an anionic ligand when it contacts the activator-support, or any other mechanisms by which activation may occur. While the activator-support activates the metallocene in the absence of cocatalysts, it is not necessary to eliminate cocatalysts from the catalyst composition. The activation function of the activator-support is evident in the enhanced activity of catalyst composition as a whole, as compared to a catalyst composition containing the corresponding untreated solid oxide. However, it is believed that the activator-support functions as an activator, even in the absence of an organoaluminum compound, aluminoxanes, organoboron compounds, or ionizing ionic compounds.

In one aspect, the activator-support of this invention comprises a solid inorganic oxide material, a mixed oxide material, or a combination of inorganic oxide materials, that is chemically-treated with an electron-withdrawing component, and optionally treated with a metal. Thus, the solid oxide of this invention encompasses oxide materials such as alumina, "mixed oxide" compounds thereof such as silica-alumina, and combinations and mixtures thereof. The mixed oxide compounds such as silica-alumina single chemical phases with more than one metal combined with oxygen to form a solid oxide compound, and are encompassed by this invention.

In one aspect of this invention, the activator-support further comprises a metal or metal ion such as zinc, nickel, vanadium, silver, copper, gallium, tin, tungsten, molybdenum, or any combination thereof. Examples of activator-supports that further comprise a metal or metal ion include, but are not limited to, zinc-impregnated chlorided alumina, zinc-impregnated fluorided alumina, zinc-impregnated chlorided silica-alumina, zinc-impregnated fluorided silica-alumina, zinc-impregnated sulfated alumina, or any combination thereof.

In another aspect, the activator-support of this invention comprises a solid oxide of relatively high porosity, which exhibits Lewis acidic or Brønsted acidic behavior. The solid oxide is chemically-treated with an electron-withdrawing component, typically an electron-withdrawing anion or an electron-withdrawing anion source, to form a activator-support. While not intending to be bound by the following statement, it is believed that treatment of the inorganic oxide with an electron-withdrawing component augments or enhances the acidity of the oxide. Thus, the activator-support exhibits Lewis or Brønsted acidity which is typically greater than the Lewis or Brønsted acidity of the untreated solid oxide. One method to quantify the acidity of the chemically-treated and untreated solid oxide materials is by comparing the polymerization activities of the treated and untreated oxides under acid catalyzed reactions. Generally, it is observed that the greater the electron-withdrawing ability or Lewis acidity of the activator-support, the greater its polymerization activity.

In one aspect, the chemically-treated solid oxide comprises a solid inorganic oxide comprising oxygen and at least one element selected from Group 2, 3, 4, 5, 6, 7, 8, 9, 10, 11, 12, 13, 14, or 15 of the periodic table, or comprising oxygen and at least one element selected from the lanthanide or actinide elements. (See: *Hawley's Condensed Chemical Dictionary*, 11$^{th}$ Ed., John Wiley & Sons; 1995; Cotton, F. A.; Wilkinson, G.; Murillo; C. A.; and Bochmann; M. *Advanced Inorganic Chemistry*, 6$^{th}$ Ed., Wiley-Interscience, 1999.) Usually, the inorganic oxide comprises oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn or Zr.

Suitable examples of solid oxide materials or compounds that can be used in the chemically-treated solid oxide of the present invention include, but are not limited to, $Al_2O_3$, $B_2O_3$, BeO, $Bi_2O_3$, CdO, $CO_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. Examples of mixed oxides that can be used in the activator-support of the present invention include, but are not limited to, silica-alumina, silica-titania, silica-zirconia, zeolites, many clay minerals, alumina-titania, alumina-zirconia, and the like.

In one aspect of this invention, the solid oxide material is chemically-treated by contacting it with at least one electron-withdrawing anion, which may be derived from any electron-withdrawing component or an electron-withdrawing anion source. Further, the solid oxide material is optionally chemically-treated with a metal ion, then calcining to form a metal-containing or metal-impregnated chemically-treated solid oxide. Alternatively, a solid oxide material and an electron-withdrawing anion source are contacted and calcined simultaneously. The method by which the oxide is contacted with an electron-withdrawing component, typically a salt or an acid of an electron-withdrawing anion, includes, but is not limited to, gelling, co-gelling, impregnation of one compound onto another, and the like. Typically, following any contacting method, the contacted mixture of oxide compound, electron-withdrawing anion, and optionally the metal ion is calcined.

The electron-withdrawing component used to treat the oxide is any component that increases the Lewis or Brønsted acidity of the solid oxide upon treatment. In one aspect, the electron-withdrawing component is an electron-withdrawing anion source compound derived from a salt, an acid, or other compound such as a volatile organic compound that may serve as a source or precursor for that anion. Examples of electron-withdrawing anions and electron-withdrawing anion sources include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, trifluoroacetate, triflate, and the like, including mixtures and combinations thereof. In addition, other ionic or non-ionic compounds that serve as sources for these electron-withdrawing anions may also be employed in the present invention.

When the electron-withdrawing component comprises a salt of an electron-withdrawing anion, the counterion or cation of that salt may be any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron withdrawing anions, in varying proportions, can be used to tailor the specific acidity of the activator-support to the desired level. Combinations of electron withdrawing components may be contacted with the oxide material simultaneously or individually, and any order that affords the desired activator-support acidity. For example, one aspect of this invention is employing two or more electron-withdrawing anion source compounds in two or more separate contacting steps. Thus, one example of such a process by which an activator-support is prepared is as follows: a solid oxide compound, or combination of oxide compounds, is contacted with a first electron-withdrawing anion source compound to form a first mixture, this first mixture is then calcined, the calcined first mixture is then contacted with a second electron-withdrawing anion source compound to form a second mixture, followed by calcining said second mixture to form a treated solid oxide compound. In such a process, the first and second electron-withdrawing anion source compounds are typically different compounds, although they may be the same compound.

In one aspect of the invention, the solid oxide activator-support is produced by a process comprising:

1) contacting a solid oxide compound with at least one electron-withdrawing anion source compound to form a first mixture; and 2) calcining the first mixture to form the solid oxide activator-support.

In another aspect of this invention, the solid oxide activator-support is produced by a process comprising:

1) contacting at least one solid oxide compound with a first electron-withdrawing anion source compound to form a first mixture; and 2) calcining the first mixture to produce a calcined first mixture;

3) contacting the calcined first mixture with a second electron-withdrawing anion source compound to form a second mixture; and 4) calcining the second mixture to form the solid oxide activator-support. Thus, the solid oxide activator-support is sometimes referred to simply as a treated solid oxide or a chemically-treated solid oxide.

Another aspect of this invention is producing or forming the solid oxide activator-support by contacting at least one solid oxide with at least one electron-withdrawing anion source compound, wherein the at least one solid oxide compound is calcined before, during or after contacting the electron-withdrawing anion source, and wherein there is a substantial absence of aluminoxanes and organoboron compounds.

In one aspect of this invention, once the solid oxide has been treated and dried, it may be subsequently calcined. Calcining of the treated solid oxide is generally conducted in an ambient atmosphere, typically in a dry ambient atmosphere, at a temperature from about 200° C. to about 900° C., and for a time of about 1 minute to about 100 hours. In another aspect, calcining is conducted at a temperature from about 300° C. to about 800° C. and in another aspect, calcining is conducted at a temperature from about 400° C. to about 700° C. In yet another aspect, calcining is conducted from about 1 hour to about 50 hours, and in another aspect calcining is conducted, from about 3 hours to about 20 hours. In still another aspect, calcining may be carried out from about 1 to about 10 hours at a temperature from about 350° C. to about 550° C.

Further, any type of suitable ambient can be used during calcining. Generally, calcining is conducted in an oxidizing atmosphere, such as air. Alternatively, an inert atmosphere, such as nitrogen or argon, or a reducing atmosphere such as hydrogen or carbon monoxide, may be used.

In another aspect of the invention, the solid oxide component used to prepare the chemically-treated solid oxide has a pore volume greater than about 0.01 cc/g. In another aspect, the solid oxide component has a pore volume greater than about 0.1 cc/g, and in yet another aspect, greater than about 1.0 cc/g. In still another aspect, the solid oxide component has a surface area from about 1 to about 1000 $m^2/g$. In another aspect, solid oxide component has a surface area from about 100 to about 800 $m^2/g$, and in still another aspect, from about 250 to about 600 $m^2/g$.

The solid oxide material may be treated with a source of halide ion or sulfate ion, or a combination of anions, and optionally treated with a metal ion, then calcined to provide the activator-support in the form of a particulate solid. In one aspect, the solid oxide material is treated with a source of sulfate, termed a sulfating agent, a source of chloride ion, termed a chloriding agent, a source of fluoride ion, termed a fluoriding agent, or a combination thereof, and calcined to provide the solid oxide activator. In another aspect, useful acidic activator-supports include, but are not limited to: bromided alumina; chlorided alumina; fluorided alumina; sulfated alumina; bisulfate-treated alumina; bromided silica-alumina, chlorided silica-alumina; fluorided silica-alumina; sulfated silica-alumina; bromided silica-zirconia, chlorided silica-zirconia; fluorided silica-zirconia; fluorided silica-titania; fluorided-chlorided alumina; sulfated silica-zirconia; chlorided zinc aluminate; chlorided tungsten aluminate; fluorided silica-boria; silica treated with fluoroborate; a pillared clay such as a pillared montmorillonite, optionally treated with fluoride, chloride, or sulfate; phosphated alumina, or other aluminophosphates, optionally treated with sulfate, fluoride, or chloride; or any combination thereof. Further, any of the activator-supports may optionally be treated with a metal ion.

In one aspect of this invention, the treated oxide activator-support comprises a fluorided solid oxide in the form of a particulate solid, thus a source of fluoride ion is added to the oxide by treatment with a fluoriding agent. In still another aspect, fluoride ion may be added to the oxide by forming a slurry of the oxide in a suitable solvent such as alcohol or water, including, but are not limited to, the one to three carbon alcohols because of their volatility and low surface tension. Examples of fluoriding agents that can be used in this invention include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), analogs thereof, and combinations thereof. For example, ammonium bifluoride $NH_4HF_2$ may be used as the fluoriding agent, due to its ease of use and ready availability.

In another aspect of the present invention, the solid oxide can be treated with a fluoriding agent during the calcining step. Any fluoriding agent capable of thoroughly contacting the solid oxide during the calcining step can be used. For example, in addition to those fluoriding agents described previously, volatile organic fluoriding agents may be used. Examples of volatile organic fluoriding agents useful in this aspect of the invention include, but are not limited to, freons, perfluorohexane, perfluorobenzene, fluoromethane, trifluoroethanol, and combinations thereof. Gaseous hydrogen fluoride or fluorine itself can also be used with the solid oxide is fluorided during calcining. One convenient method of contacting the solid oxide with the fluoriding agent is to vaporize a fluoriding agent into a gas stream used to fluidize the solid oxide during calcination.

Similarly, in another aspect of this invention, the chemically-treated solid oxide comprises a chlorided solid oxide in the form of a particulate solid, thus a source of chloride ion is added to the oxide by treatment with a chloriding agent. The chloride ion may be added to the oxide by forming a slurry of the oxide in a suitable solvent. In another aspect of the present invention, the solid oxide can be treated with a chloriding agent during the calcining step. Any chloriding agent capable of serving as a source of chloride and thoroughly contacting the oxide during the calcining step can be used. For example, volatile organic chloriding agents may be used. Examples of volatile organic chloriding agents useful in this aspect of the invention include, but are not limited to, certain freons, perchlorobenzene, chloromethane, dichloromethane, chloroform, carbon tetrachloride, trichloroethanol, or any combination thereof. Gaseous hydrogen chloride or chlorine itself can also be used with the solid oxide during calcining. One convenient method of contacting the oxide with the chloriding agent is to vaporize a chloriding agent into a gas stream used to fluidize the solid oxide during calcination.

In one aspect, the amount of fluoride or chloride ion present before calcining the solid oxide is generally from about 2 to about 50% by weight, where the weight percents are based on the weight of the solid oxide, for example silica-alumina, before calcining. In another aspect, the amount of fluoride or chloride ion present before calcining the solid oxide is from about 3 to about 25% by weight, and in another aspect, from about 4 to about 20% by weight. If the fluoride or chloride ion is added during calcining, such as when calcined in the presence of $CCl_4$, there is typically no fluoride or chloride ion in the solid oxide before calcining. Once impregnated with halide, the halided oxide may be dried by any method known in the art including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina can have a pore volume greater than about 0.5 cc/g. In one aspect, the pore volume may be greater than about 0.8 cc/g, and in another aspect, the pore volume may be greater than about 1.0 cc/g. Further, the silica-alumina may have a surface area greater than about 100 $m^2/g$. In one aspect, the surface area is greater than about 250 $m^2/g$, and in another aspect, the surface area may be greater than about 350 $m^2/g$. Generally, the silica-alumina of this invention has an alumina content from about 5 to about 95%. In one aspect, the alumina content of the silica-alumina may be from about 5 to about 50%, and in another aspect, the alumina content of the silica-alumina may be from about 8% to about 30% alumina by weight.

The sulfated solid oxide comprises sulfate and a solid oxide component such as alumina or silica-alumina, in the form of a particulate solid. Optionally, the sulfated oxide is further treated with a metal ion such that the calcined sulfated oxide comprises a metal. In one aspect, the sulfated solid oxide comprises sulfate and alumina. In one aspect of this invention, the sulfated alumina is formed by a process wherein the alumina is treated with a sulfate source, for example, but not limited to, sulfuric acid or a sulfate salt such as ammonium sulfate. In one aspect, this process may be performed by forming a slurry of the alumina in a suitable solvent such as alcohol or water, in which the desired concentration of the sulfating agent has been added. Suitable organic solvents include, but are not limited to, the one to three carbon alcohols because of their volatility and low surface tension.

The amount of sulfate ion present before calcining is generally from about 1 to about 50% by weight, typically from about 5 to about 30% by weight, and more typically from about 10 to about 25% by weight, where the weight percents are based on the weight of the solid oxide before calcining. Once impregnated with sulfate, the sulfated oxide may be dried by any method known in the art including, but not limited to, suction filtration followed by evaporation, drying under vacuum, spray drying, and the like, although it is also possible to initiate the calcining step immediately.

In addition to being treated with an electron-withdrawing component such as halide or sulfate ion, the solid inorganic oxide of this invention may optionally be treated with a metal source, including metal salts or metal-containing compounds. In one aspect of the invention, these compounds may be added to or impregnated onto the solid oxide in solution form, and subsequently converted into the supported metal upon calcining. Accordingly, the solid inorganic oxide can further comprise a metal such as zinc, nickel, vanadium, silver, copper, gallium, tin, tungsten, molybdenum, or a combination thereof. For example, zinc may be used to impregnate the solid oxide because it provides good catalyst activity and low cost. The solid oxide may be treated with metal salts or metal-containing compounds before, after, or at the same time that the solid oxide is treated with the electron-withdrawing anion.

Further, any method of impregnating the solid oxide material with a metal may be used. The method by which the oxide is contacted with a metal source, typically a salt or metal-containing compound, includes, but is not limited to, gelling, co-gelling, impregnation of one compound onto another, and the like. Following any contacting method, the contacted mixture of oxide compound, electron-withdrawing anion, and the metal ion is typically calcined. Alternatively, a solid oxide material, an electron-withdrawing anion source, and the metal salt or metal-containing compound are contacted and calcined simultaneously.

In another aspect, the metallocene compound may be contacted with a borinic acid or boronic acid for a first period of time prior to contacting this mixture with the acidic activator-support and an organoaluminum cocatalyst. Once the precontacted mixture of metallocene and borinic acid or boronic acid is contacted with the acidic activator-support and an organoaluminum, the composition further comprising the acidic activator-support and organoaluminum is termed the "postcontacted" mixture. The postcontacted mixture may be allowed to remain in further contact for a second period of time prior to being charged into the reactor in which the polymerization process will be carried out.

Various processes to prepare solid oxide activator-supports that can be employed in this invention have been reported. For example, U.S. Pat. Nos. 6,107,230, 6,165,929, 6,294,494, 6,300,271, 6,316,553, 6,355,594, 6,376,415, 6,391,816, 6,395,666, 6,524,987, and 6,548,441, describe such methods, each of which is incorporated by reference herein, in its entirety.

The Organoaluminum Compound

In one aspect, the present invention provides catalyst compositions comprising at least one metallocene compound, at least one borinic acid or boronic acid, at least one acidic activator-support and at least one organoaluminum compound. In another one aspect, the metallocene compound is precontacted with the borinic acid or boronic acid to form a precontacted mixture, prior to contacting this precontacted mixture with the acidic activator-support and the organoaluminum compound.

In yet another aspect, the organoaluminum compound that can be used in this invention is a compound having the following general formula:

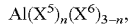

$$Al(X^5)_n(X^6)_{3-n},$$

wherein $(X^5)$ is a hydrocarbyl having from 2 to about 20 carbon atoms, and $(X^6)$ is an alkoxide or aryloxide, any one of which having from 1 to about 20 carbon atoms, halide, or hydride; and n is a number from 1 to 3, inclusive. In one aspect, $(X^5)$ is an alkyl having from 2 to about 10 carbon atoms, and in another aspect, $(X^5)$ is ethyl, propyl, n-butyl, sec-butyl, isobutyl, hexyl, and the like.

The substituent $(X^6)$ in the formula for the organoaluminum compound is alkoxide or aryloxide, any one of which having from 1 to about 20 carbon atoms, halide, or hydride. In one aspect, $(X^6)$ is independently fluoro or chloro, and in another aspect, $(X^6)$ is chloro.

In the formula $Al(X^5)_n(X^6)_{3-n}$ for the organoaluminum compound, n is a number from 1 to 3 inclusive, and typically, n is 3. The value of n is not restricted to be an integer, therefore this formula includes sesquihalide compounds.

Generally, examples of organoaluminum compounds that can be used in this invention include, but are not limited to, trialkylaluminum compounds, dialkylaluminium halide compounds, alkylaluminum dihalide compounds, alkylaluminum sesquihalide compounds, and combinations thereof. Specific examples of organoaluminum compounds that can be used in this invention in the precontacted mixture with the organometal compound and a borinic acid or boronic acid include, but are not limited to, triethylaluminum (TEA); tripropylaluminum; diethylaluminum ethoxide; tributylaluminum; diisobutylaluminum hydride; triisobutylaluminum; and diethylaluminum chloride.

The amounts of organoaluminum compound disclosed herein include the total amount of organoaluminum compound used in the post contacting and any additional organoaluminum compound added to the polymerization reactor. Therefore, total amounts of organoaluminum compounds are disclosed, regardless of whether a single organoaluminum compound is used, or more than one organoaluminum compound.

The Optional Aluminoxane Cocatalyst

In one aspect, the present invention provides a catalyst composition comprising at least one metallocene, at least one borinic acid or boronic acid, at least one acidic activator-support, at least one organoaluminum compound, and further comprising an optional cocatalyst. In one aspect, the optional cocatalyst may be at least one aluminoxane, at least one organoboron compound, at least one ionizing ionic compound, or any combination thereof. In another aspect, the optional cocatalyst may be used in the precontacting step, in the postcontacting step, or in both steps. Further, any combination of cocatalysts may be used in either step, or in both steps.

Aluminoxanes are also referred to as poly(hydrocarbyl aluminum oxides) or simply organoaluminoxanes. The other catalyst components are typically contacted with the aluminoxane in a saturated hydrocarbon compound solvent, though any solvent which is substantially inert to the reactants, intermediates, and products of the activation step can be used. The catalyst composition formed in this manner may be collected by methods known to those of skill in the art, including but not limited to filtration, or the catalyst composition may be introduced into the polymerization reactor without being isolated.

The aluminoxane compound can be an oligomeric aluminum compound, wherein the aluminoxane compound can comprise linear structures, cyclic, or cage structures, or typically mixtures of all three. Cyclic aluminoxane compounds having the formula:

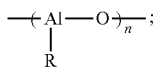

wherein
R is a linear or branched alkyl having from 1 to 10 carbon atoms, and n is an integer from 3 to about 10 are encompassed by this invention. The $(AlRO)_n$ moiety shown here also constitutes the repeating unit in a linear aluminoxane. Thus, linear aluminoxanes having the formula:

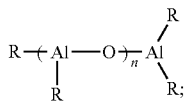

wherein
R is a linear or branched alkyl having from 1 to 10 carbon atoms, and n is an integer from 1 to about 50, are also encompassed by this invention.

Further, aluminoxanes may also have cage structures of the formula $R^t_{5m+\alpha}R^b_{m-\alpha}Al_{4m}O_{3m}$, wherein m is 3 or 4 and $\alpha$ is $= n_{Al(3)} - n_{O(2)} + n_{O(4)}$; wherein $n_{Al(3)}$ is the number of three coordinate aluminum atoms, $n_{O(2)}$ is the number of two coordinate oxygen atoms, $n_{O(4)}$ is the number of 4 coordinate oxygen atoms, $R^t$ represents a terminal alkyl group, and $R^b$ represents a bridging alkyl group; wherein R is a linear or branched alkyl having from 1 to 10 carbon atoms.

Thus, aluminoxanes that can serve as optional cocatalysts in this invention are generally represented by formulas such as $(R-Al-O)_n$, $R(R-Al-O)_nAlR_2$, and the like, wherein the R group is typically a linear or branched $C_1$-$C_6$ alkyl such as methyl, ethyl, propyl, butyl, pentyl, or hexyl wherein n typically represents an integer from 1 to about 50. In one embodiment, the aluminoxane compounds of this invention include, but are not limited to, methylaluminoxane, ethylaluminoxane, n-propylaluminoxane, iso-propyl-aluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, iso-pentylaluminoxane, neopentylaluminoxane, or combinations thereof.

While organoaluminoxanes with different types of R groups are encompassed by the present invention, methyl aluminoxane (MAO), ethyl aluminoxane, or isobutyl aluminoxane are typical optional cocatalysts used in the catalyst compositions of this invention. These aluminoxanes are prepared from trimethylaluminum, triethylaluminum, or triisobutylaluminum, respectively, and are sometimes referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as disclosed in U.S. Pat. No. 4,794,096, which is herein incorporated by reference in its entirety.

The present invention contemplates many values of n in the aluminoxane formulas $(R-Al-O)_n$ and $R(R-Al-O)_n AlR_2$, and preferably n is at least about 3. However, depending upon how the organoaluminoxane is prepared, stored, and used, the value of n may be variable within a single sample of aluminoxane, and such a combination of organoaluminoxanes are comprised in the methods and compositions of the present invention.

In preparing the catalyst composition of this invention comprising an optional aluminoxane, the molar ratio of the aluminum in the alumixoane to the metallocene in the composition is usually from about 1:10 to about 100,000:1. In one another aspect, the molar ratio of the aluminum in the alumixoane to the metallocene in the composition is usually from about 5:1 to about 15,000:1. The amount of optional aluminoxane added to a polymerization zone is an amount within a range of about 0.01 mg/L to about 1000 mg/L, from about 0.1 mg/L to about 100 mg/L, or from about 1 mg/L to abut 50 mg/L.

Organoaluminoxanes can be prepared by various procedures which are well known in the art. Examples of organoaluminoxane preparations are disclosed in U.S. Pat. Nos. 3,242,099 and 4,808,561, each of which is incorporated by reference herein, in its entirety. One example of how an aluminoxane may be prepared is as follows. Water which is dissolved in an inert organic solvent may be reacted with an aluminum alkyl compound such as $AlR_3$ to form the desired organoaluminoxane compound. While not intending to be bound by this statement, it is believed that this synthetic method can afford a mixture of both linear and cyclic $(R-Al-O)_n$ aluminoxane species, both of which are encompassed by this invention. Alternatively, organoaluminoxanes may be prepared by reacting an aluminum alkyl compound such as $AlR_3$ with a hydrated salt, such as hydrated copper sulfate, in an inert organic solvent.

The Optional Organoboron Compounds

In one aspect, the present invention provides a catalyst composition comprising at least one metallocene, at least one borinic acid or boronic acid, at least one acidic activator-support, at least one organoaluminum compound, and further comprising an optional cocatalyst. In one aspect, the optional cocatalyst may be at least one aluminoxane, at least one organoboron compound, at least one ionizing ionic compound, or any combination thereof. In another aspect, the optional cocatalyst may be used in the precontacting step, in the postcontacting step, or in both steps. Further, any combination of cocatalysts may be used in either step, or in both steps.

In one aspect, the organoboron compound comprises neutral boron compounds, borate salts, or combinations thereof. For example, the organoboron compounds of this invention can comprise a fluoroorgano boron compound, a fluoroorgano borate compound, or a combination thereof. Any fluoroorgano boron or fluoroorgano borate compound known in the art can be utilized. The term fluoroorgano boron compounds has its usual meaning to refer to neutral compounds of the form $BY_3$. The term fluoroorgano borate compound also has its usual meaning to refer to the monoanionic salts of a fluoroorgano boron compound of the form $[cation]^+[BY_4]^-$, where Y represents a fluorinated organic group. For convenience, fluoroorgano boron and fluoroorgano borate compounds are typically referred to collectively by organoboron compounds, or by either name as the context requires.

Examples of fluoroorgano borate compounds that can be used as cocatalysts in the present invention include, but are not limited to, fluorinated aryl borates such as, N,N-dimethylanilinium tetrakis(pentafluorophenyl)borate, triphenylcarbenium tetrakis(pentafluorophenyl)borate, lithium tetrakis (pentafluorophenyl)borate, N,N-dimethylanilinium tetrakis [3,5-bis(trifluoromethyl)phenyl]borate, triphenylcarbenium tetrakis[3,5-bis(trifluoromethyl)phenyl]borate, and the like, including mixtures thereof. Examples of fluoroorgano boron compounds that can be used as cocatalysts in the present invention include, but are not limited to, tris(pentafluorophenyl)boron, tris[3,5-bis(trifluoromethyl)phenyl]boron, and the like, including mixtures thereof.

Although not intending to be bound by any theory, these examples of fluoroorgano borate and fluoroorgano boron compounds, and related compounds, are thought to form "weakly-coordinating" anions when combined with organometal compounds, as disclosed in U.S. Pat. No. 5,919,983, which is incorporated herein by reference in its entirety.

Generally, any amount of organoboron compound can be utilized in this invention. In one aspect, the molar ratio of the organoboron compound to the metallocene compound in the composition is from about 0.1:1 to about 10:1. Typically, the amount of the fluoroorgano boron or fluoroorgano borate compound used as a cocatalyst for the metallocene is in a range of from about 0.5 mole to about 10 moles of boron compound per mole of metallocene compound. In one aspect, the amount of fluoroorgano boron or fluoroorgano borate compound used as a cocatalyst for the metallocene is in a range of from about 0.8 mole to about 5 moles of boron compound per mole of metallocene compound.

The Optional Ionizing Ionic Compound Cocatalyst

In one aspect, the present invention provides a catalyst composition comprising at least one metallocene, at least one borinic acid or boronic acid, at least one acidic activator-support, at least one organoaluminum compound, and further comprising an optional cocatalyst. In one aspect, the optional cocatalyst may be at least one aluminoxane, at least one organoboron compound, at least one ionizing ionic compound, or any combination thereof. In another aspect, the optional cocatalyst may be used in the precontacting step, in the postcontacting step, or in both steps. Further, any combination of cocatalysts may be used in either step, or in both steps. Examples of ionizing ionic compound are disclosed in U.S. Pat. Nos. 5,576,259 and 5,807,938, each of which is incorporated herein by reference, in its entirety.

An ionizing ionic compound is an ionic compound which can function to enhance activity of the catalyst composition. While not bound by theory, it is believed that the ionizing ionic compound may be capable of reacting with the metallocene compound and converting the metallocene into a cationic metallocene compound. Again, while not intending to be bound by theory, it is believed that the ionizing ionic compound may function as an ionizing compound by completely or partially extracting an anionic ligand, possibly a non-$\eta^5$-alkadienyl ligand such as ($X^3$) or ($X^4$), from the metallocene. However, the ionizing ionic compound is an activator regardless of whether it is ionizes the metallocene, abstracts an ($X^3$) or ($X^4$) ligand in a fashion as to form an ion pair, weakens the metal-($X^3$) or metal-($X^4$) bond in the metallocene, simply coordinates to an ($X^3$) or ($X^4$) ligand, or any other mechanisms by which activation may occur. Further, it is not necessary that the ionizing ionic compound activate the metallocene only. The activation function of the ionizing ionic compound is evident in the enhanced activity of catalyst composition as a whole, as compared to a catalyst composition containing catalyst composition that does not comprise any ionizing ionic compound.

Examples of ionizing ionic compounds include, but are not limited to, the following compounds: tri(n-butyl)ammonium tetrakis(p-tolyl)borate, tri(n-butyl)-ammonium tetrakis(m-tolyl)borate, tri(n-butyl)ammonium tetrakis(2,4-dimethyl) borate, tri(n-butyl)ammonium tetrakis(3,5-dimethylphenyl) borate, tri(n-butyl)ammonium tetrakis[3,5-bis (trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis[3,5-bis (trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl) borate, triphenylcarbenium tetrakis(2,4-dimethylphenyl)borate, triphenylcarbenium tetrakis(3,5-dimethylphenyl) borate, triphenylcarbenium tetrakis[3,5-bis(trifluoromethyl) phenyl]borate, triphenylcarbenium tetrakis (pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoromethyl)phenyl]borate, tropylium tetrakis(pentafluorophenyl)borate, lithium tetrakis(pentafluorophenyl)borate, lithium tetrakis (phenyl)borate, lithium tetrakis(p-tolyl)borate, lithium tetrakis(m-tolyl)borate, lithium tetrakis(2,4-dimethylphenyl) borate, lithium tetrakis(3,5-dimethylphenyl)borate, lithium tetrafluoroborate, sodium tetrakis(pentafluorophenyl)borate, sodium tetrakis(phenyl)borate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis (pentafluorophenyl)borate, potassium tetrakis(phenyl) borate, potassium tetrakis(p-tolyl)borate, potassium tetrakis (m-tolyl)borate, potassium tetrakis(2,4-dimethylphenyl) borate, potassium tetrakis(3,5-dimethylphenyl)borate, potassium tetrafluoroborate, tri(n-butyl)ammonium tetrakis (p-tolyl)aluminate, tri(n-butyl)ammonium tetrakis(m-tolyl) aluminate, tri(n-butyl)ammonium tetrakis(2,4-dimethyl)aluminate, tri(n-butyl)ammonium tetrakis(3,5-dimethylphenyl) aluminate, tri(n-butyl)ammonium tetrakis (pentafluorophenyl)aluminate, N,N-dimethylanilinium tetrakis(p-tolyl)aluminate, N,N-dimethylanilinium tetrakis (m-tolyl)aluminate, N,N-dimethylanilinium tetrakis(2,4-dimethylphenyl)aluminate, N,N-dimethylanilinium tetrakis (3,5-dimethylphenyl)aluminate, N,N-dimethylanilinium tetrakis(pentafluorophenyl)aluminate, triphenylcarbenium tetrakis(p-tolyl)aluminate, triphenylcarbenium tetrakis(m-tolyl)aluminate, triphenylcarbenium tetrakis(2,4-dimethylphenyl)aluminate, triphenylcarbenium tetrakis(3,5-dimethylphenyl)aluminate, triphenylcarbenium tetrakis (pentafluorophenyl)aluminate, tropylium tetrakis(p-tolyl) aluminate, tropylium tetrakis(m-tolyl)aluminate, tropylium tetrakis(2,4-dimethylphenyl)aluminate, tropylium tetrakis(3, 5-dimethylphenyl)aluminate, tropylium tetrakis(pentafluorophenyl)aluminate, lithium tetrakis(pentafluorophenyl)aluminate, lithium tetrakis(phenyl)aluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis(pentafluoro-phenyl)aluminate, sodium tetrakis(phenyl)aluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl) aluminate, sodium tetrafluoroaluminate, potassium tetrakis (pentafluorophenyl)aluminate, potassium tetrakis(phenyl) aluminate, potassium tetrakis(p-tolyl)aluminate, potassium tetrakis(m-tolyl)aluminate, potassium tetrakis(2,4-dimethylphenyl)aluminate, potassium tetrakis(3,5-dimethylphenyl) aluminate, potassium tetrafluoroaluminate, However, the ionizing ionic compound is not limited thereto in the present invention.

Preparation of the Catalyst Composition

In accordance with this invention, the catalyst compositions may be prepared by a process comprising precontacting an organometal compound with a borinic acid or boronic acid for an effective period of time, before this mixture is contacted with the activator-support and an organoaluminum compound for an effective period of time. In one aspect, the process of preparing the catalyst of this invention may occur in an inert atmosphere and under substantially anhydrous conditions. Thus, the atmosphere is substantially oxygen-free and substantially free of water as the reaction begins, to prevent deactivation of the catalyst. In one aspect of this invention, for example, a zirconium metallocene, such as bis(cyclopentadienyl)zirconium dimethyl is precontacted with a borinic acid or boronic acid for at least about 1 minute prior to contacting this mixture with a fluorided silica-alumina activator-support and an organoaluminum compound. Once this precontacted mixture is brought into contact with the activator-support and an organoaluminum compound, this postcontacted mixture is allowed to remain in contact for from about 1 minute to about 24 hours, typically from about 5 minutes to about 5 hours, and more typically from about 10 minutes to about 1 hour, prior to using this mixture in a polymerization process.

Typically, the mixture of metallocene and borinic acid or boronic acid, before it is contacted with the activator-support, is termed the "precontacted" mixture. Accordingly, the components of the precontacted mixture are termed precontacted metallocene and precontacted borinic acid or boronic acid. The mixture of the precontacted mixture and the acidic activator-support and the organoaluminum compound, that is, the mixture of the metallocene, borinic acid or boronic acid, acidic activator-support, and organoaluminum compound, is typically termed the "postcontacted" mixture. Accordingly, the components of the postcontacted mixture are termed postcontacted metallocene, postcontacted borinic acid or boronic acid, postcontacted acidic activator-support and postcontacted organoaluminum compound.

In one aspect of this invention, improved catalytic activities may be achieved when the precontacted mixture comprises various components other than the metallocene, borinic acid or boronic acid. In this aspect, the components of the precontacted mixture and the postcontacted mixture vary, such that the resulting catalyst composition can be tailored for the desired activity, or to accommodate a particular polymerization process.

The precontacting step may be carried out in a variety of ways, including but not limited to, blending. Furthermore, each of the organometal compound and the borinic acid or boronic acid compound can be fed into a reactor separately, or can be contacted with each other before being further contacted in the reactor. Typically, the mixture of metallocene, and borinic acid or boronic acid, was precontacted from minutes to days in a separate reactor, prior to contacting this mixture with activator-support and organoaluminum compound to form the postcontacted mixture. This precontacting step is usually carried out under an inert atmosphere. Further, the precontacting step may be carried out with stirring, agitation, heating, cooling, sonication, shaking, under pressure, at room temperature, in an inert solvent (typically a hydrocarbon), and the like. However, such conditions are not necessary as the precontacting step may be carried out by simply allowing the components to stand substantially undisturbed.

In another aspect of this invention, the precontacted mixture is prepared first by contacting an organometal (typically a metallocene) and the borinic acid or boronic acid compound before injection into the reactor, typically for about 1 minute to about 9 days, more typically from about 1 minute to about 24 hours. The components of the precontacted mixture are generally contacted at a temperature from about 10° C. to about 200° C., typically from about 15° C. to about 80° C. This precontacted mixture is then placed in contact with the acidic activator-support, typically a fluorided silica-alumina activator-support and an organoaluminum compound, typically triisobutylaluminum as disclosed herein, to form the postcontacted mixture.

The postcontacted mixture is prepared by contacting and admixing the precontacted mixture, the acidic activator-support and the organoaluminum compound for any length of time and at any temperature and pressure that allows complete contact and reaction between the components of the postcontacted mixture. For example, this postcontacted mixture is usually allowed to remain in contact for from about 1 minute to about 24 hours, typically from about 5 minutes to about 5 hours, and more typically from about 10 minutes to about 1 hour, prior to using this mixture in a polymerization process. Once the acidic activator-support, the organoaluminum compound and the precontacted mixture have been in contact for a period of time, the composition comprises a postcontacted organometal compound (typically, a metallocene), a postcontacted borinic acid or boronic acid, a postcontacted acidic activator-support (typically fluorided silica-alumina), and a postcontacted organoaluminum compound (typically triisobutylaluminum). Generally, the postcontacted acidic activator-support is the majority, by weight, of the composition. Often, the specific nature of the final components of a catalyst prepared as described herein are not known, therefore the catalyst composition of the present invention is described as comprising postcontacted compounds and components. Further, because the exact order of contacting can be varied, it is believed that this terminology is best to describe the composition's components.

In one aspect, the postcontacting step in which the precontacted mixture is placed in contact with the acidic activator-support and organoaluminum compound is typically carried out in an inert atmosphere. Contact times between the acidic activator-support, organoaluminum compound and the precontacted mixture typically range from time about 0.1 hour to about 24 hours, and from 0.1 to about 1 hour is more typical. The mixture may be heated up to about 210° F. Temperatures between about 40° F. to about 120° F. are typical if the mixture is heated at all. While not intending to be bound by theory, these conditions are thought to assist in the deposition of a catalytically-effective amount of the catalyst on the acidic activator-support.

In general, heating is carried out at a temperature and for a duration sufficient to allow adsorption, impregnation, or interaction of precontacted mixture and the acidic activator-support, such that a portion of the components of the precontacted mixture is immobilized, adsorbed, or deposited thereon. For example, in one aspect, a catalyst composition of this invention is prepared by contacting a zirconium metallocene, such as bis(indenyl)zirconium dibenzyl or bis(cyclopentadienyl)zirconium dimethyl, and a borinic acid or boronic acid for at least about 30 minutes, followed by contacting this precontacted mixture with a fluorided silica-alumina activator-support and an organoaluminum compound for at least about 10 minutes up to one hour to form the active catalyst.

More than one metallocene can be used in the catalyst composition and methods of the present invention. When a catalyst composition comprises more than one metallocene, the metallocene compounds are employed in one or more precontacted mixtures. Thus, these multiple metallocenes may be employed in the same precontacted mixture and then used in the same postcontacted mixture, they can be employed in different precontacted mixtures which are then used to prepare the same postcontacted mixture, or they can be employed in different precontacted mixtures and different postcontacted mixtures which are then introduced into the polymerization reactor.

In one aspect, the molar ratio of the organometal or metallocene compound to the organoaluminum compound is about 1:1 to about 1:10,000, typically from about 1:1 to about 1:1,000, and more typically from about 1:1 to about 1:100. These molar ratios reflect the ratio of metallocene compound to the total amount of organoaluminum compound in both the precontacted mixture and the postcontacted mixture.

Generally, the molar ratio of borinic acid or boronic acid to organometal or metallocene compound in the precontacted mixture is about 1:10 to about 10:1, typically about 1:1 to 2:1.

In another aspect of this invention, the weight ratio of the acidic activator-support to the organoaluminum compound generally ranges from about 1:5 to about 1,000:1, typically from about 1:3 to about 100:1, and more typically from about 1:1 to about 50:1. In a further aspect of this invention, the weight ratio of the metallocene to the acidic activator-support is typically from about 1:1 to about 1:10,000,000, more typically from about 1:10 to about 1:100,000, even more typically from about 1:20 to about 1:1000. These ratios that involve the acidic activator-support are based on the amount of the components that have been added to make up the postcontacted mixture to provide the catalyst composition.

One aspect of this invention is that aluminoxane is not required to form the catalyst composition disclosed herein, a feature that allows lower polymer production costs. Accordingly, the present invention uses only $AlR_3$-type organoaluminum compounds which do not activate the metallocene catalyst in the same manner as an organoaluminoxane. Additionally, no expensive borate compounds or $MgCl_2$ are required to form the catalyst composition of this invention, although aluminoxane, borate compounds, $MgCl_2$, or combinations thereof can optionally be used in some aspects of this invention. However, another aspect of this invention is the use of optional cocatalysts, including, but not limited to, at least one aluminoxane, at least one organoboron compound, at least one ionizing ionic compound, or any combination thereof.

In another aspect of this invention, the components of the precontacted mixture and the postcontacted mixture vary, such that the resulting catalyst composition can be tailored for the desired activity, or the method of preparing the catalyst composition can accommodate the desired polymerization process. For example, in one aspect, the catalyst composition of this invention comprises a precontacted metallocene, a precontacted borinic acid or boronic acid, a postcontacted acidic activator-support, and a postcontacted organoaluminum compound. In another aspect, the catalyst composition of this invention comprises a precontacted metallocene, a precontacted borinic acid or boronic acid, a postcontacted organoaluminum compound and a postcontacted acidic activator-support. In each of these aspects in which the components of the precontacted or postcontacted mixtures vary, the relative amounts of each component in the precontacted or postcontacted mixtures are typically within the same ranges as those disclosed here for the catalyst composition comprising a precontacted metallocene, a precontacted borinic acid or boronic acid, a postcontacted acidic activator-support, and a postcontacted organoaluminum compound Utility of the Catalyst Composition in Polymerization Processes The catalysts of the present invention are intended for any olefin polymerization method known in the art, using various types of polymerization reactors. As used herein, "polymerization reactor" includes any polymerization reactor capable of polymerizing olefin monomers to produce homopolymers or copolymers. Such homopolymers and copolymers are referred to as resins or polymers. The various types of reactors include those that may be referred to as batch, slurry, gas-phase, solution, high pressure, tubular or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of un-reacted monomer, un-reacted comonomer, and/or diluent.

Polymerization reactor systems of the present invention may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors or a combination of high pressure with loop and/or gas reactors. The multiple reactors may be operated in series or in parallel.

According to one aspect of the invention, the polymerization reactor system may comprise at least one loop slurry reactor. Such reactors may comprise vertical or horizontal loops. Monomer, diluent, catalyst and optionally any comonomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A typical slurry polymerization process (also known as the particle form process), is disclosed, for example, in U.S. Pat. Nos. 3,248,179, 4,501,885, 5,565,175, 5,575,979, 6,239,235, 6,262,191 and 6,833,415, each of which is incorporated by reference in its entirety herein.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this invention, the polymerization reactor may comprise at least one gas phase reactor. Such systems are known in the art and may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790 and 5,436,304, each of which is incorporated by reference in its entirety herein.

According to still another aspect of the invention, a high pressure polymerization reactor may comprise a tubular reactor or an autoclave reactor, both of which are known in the art. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the invention, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization. These reactors are known in the art.

Polymerization reactors suitable for the present invention may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, crack growth, long chain branching and rheological measurements.

The concentrations of monomer, co-monomer, hydrogen, co-catalyst, modifiers, and electron donors are important in producing these resin properties. Comonomer is used to control product density. Hydrogen is used to control product molecular weight. Co-catalysts can be used to alkylate, scavenge poisons and control molecular weight. Modifiers can be used to control product properties and electron donors affect stereoregularity. In addition, the concentration of poisons must be minimized since they impact the reactions and product properties.

The polymer or resin may be formed into various articles, including, but not limited to, bottles, drums, toys, household containers, utensils, film products, drums, fuel tanks, pipes, geomembranes, and liners. Various processes may be used to form these articles, including, but not limited to, blow molding, extrusion molding, rotational molding, thermoforming, cast molding and the like. After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

In one aspect, when a copolymer is desired, the monomer ethylene may be copolymerized with a comonomer. In another aspect, examples of the comonomer include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, or the five normal decenes. In another aspect, the comonomer may be 1-butene, 1-pentene, 1-hexene, 1-octene, 1-decene, or styrene.

In one aspect, the amount of comonomer introduced into a reactor zone to produce the copolymer is generally from about 0.01 to about 40 weight percent comonomer based on the total weight of the monomer and comonomer. In another aspect, the amount of comonomer introduced into a reactor zone is from about 0.01 to about 20 weight percent comonomer, and in still another aspect, from about 0.1 to about 4 weight percent comonomer based on the total weight of the monomer and comonomer. Alternatively, an amount sufficient to give the above described concentrations by weight, in the copolymer produced can be used.

While not intending to be bound by this theory, in the event that branched, substituted, or functionalized olefins are used as reactants, it is believed that steric hindrance may impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might. In one aspect, at least one reactant for the catalyst compositions of this invention is ethylene, so the polymerizations are either homopolymerizations or copolymerizations with a different acyclic, cyclic, terminal, internal, linear, branched, substituted, or unsubstituted olefin. In addition, the catalyst compositions of this invention may be used in polymerization of diolefin compounds, including but are not limited to, 1,3-butadiene, isoprene, 1,4-pentadiene, and 1,5-hexadiene.

In one aspect, catalyst composition of this invention can have an activity greater than a catalyst composition that uses the same components, but does not involve precontacting the organometal compound, and a borinic acid or boronic acid.

After catalyst activation, the catalyst composition is used to homopolymerize ethylene, or copolymerize ethylene with a comonomer.

In another aspect of this invention, the catalyst can be made in a variety of methods, including, but not limited to, continuously feeding the catalyst components directly into the polymerization reactor, including at least one optional precontacting step of some or all the catalyst components prior to introducing them into the reactor. In this aspect, each optional precontacting step can involve precontacting for a different time period. In this aspect, the invention can encompass multiple, optional precontacting steps, for multiple time periods, prior to initiating the polymerization reaction. Further, these multiple, optional precontacting steps can take place in at least one precontacting vessel prior to introducing the precontacted components into the reactor, they can take place in the polymerization reactor itself, or any combination thereof, including the use of multiple precontacting vessels comprising different catalyst components. Thus, in this aspect, any precontacting steps can encompass precontacting of any combination of catalyst components, including any optional catalyst components. Also in this aspect, the multiple, optional precontacting steps can involve different precontacting time periods.

In another aspect of this invention, the catalyst can be made by continuously feeding the catalyst components into any number of optional precontacting vessels and subsequently introducing the components continuously into the reactor. In one aspect, for example, the present invention provides a process to produce a catalyst composition, comprising:

contacting at least one metallocene, and at least one borinic acid or boronic acid for a first period of time to form a precontacted mixture comprising at least one precontacted metallocene, at least one precontacted and at least one precontacted borinic acid or boronic acid; and contacting the precontacted mixture with at least one acidic activator-support and at least one organoaluminum compound, for a second period of time to form a postcontacted mixture comprising at least one postcontacted metallocene, at least one postcontacted borinic acid or boronic acid, and at least one postcontacted acidic activator-support and at least one organoaluminum compound.

In another aspect, for example, the present invention provides a process to produce a catalyst composition, comprising:

contacting at least two catalyst components selected from at least one metallocene, and at least one borinic acid or boronic acid for a first period of time to form a precontacted mixture comprising precontacted catalyst components; and contacting the precontacted mixture with any catalyst components not used to form the precontacted mixture, and optionally contacting the precontacted mixture with additional catalyst components selected from at least one metallocene, at least one organoaluminum compound, at least one borinic acid or boronic acid, or at least one acidic activator-support for a second period of time to form a postcontacted mixture comprising at least one postcontacted metallocene, at least one postcontacted borinic acid or boronic acid, at least one postcontacted acidic activator-support and at least one postcontacted organoaluminum compound.

In another aspect, each ingredient can be fed to the reactor, either directly or through at least one precontacting vessel, using known feeding, measuring, and controlling devices, such as pumps, mass and volumetric flow meters and controllers, and the like. Feed-back signals and control loops can be used in connection with this continuous catalyst formation and introduction. The mass flow meter can be a coriolis-type meter adapted to measure a variety of flow types such as from a positive displacement-type pump with three heads. Other types of pumps, meters, and combinations of similar types of devices can be used as means for feed and control to measure and control a feed rate of a catalyst component. Various combinations of means for feed and control can also be used for each respective component depending upon the type of component, chemical compatibility of the component, and the desired quantity and flow rate of the component, and as well known to one of ordinary skill in the art. For example, a suitable meter for means for feed and control can be, but is not limited to, a thermal mass flow meter, a volumetric flow meter such as an orifice-type, diaphragm-type, a level-type meter, or the like.

In another aspect, the catalyst components can be combined in a variety or different orders and combinations prior to being introduced into the polymerization reactor. In one aspect, for example, the mixture of metallocene and boronic acid or borinic acid can be precontacted with an aluminum alkyl and an olefin in a first precontacting vessel, for a first precontacting time, for example, up to 1-10 days, to form a first precontacted solution. This first precontacted solution can then be fed to a second precontacting vessel along with the treated solid oxide component, and optionally more aluminum alkyl, for a second precontacting time. In this aspect, for example, the second precontacting time can be shorter, longer, or the same as the first precontacting time. For example, the second precontacting time can be about 0.5 hour, after which the "postcontacted" mixture can be fed from the second precontacting vessel directly into the reactor itself. In another aspect of this invention, all of the catalyst components can be brought together in the precontacting vessel for the first period of time, prior to being introduced directly into the reactor.

In another aspect, a portion of each catalyst component can be fed into the reactor directly, while the remainder is fed into a precontacting vessel. In this aspect, for example, it is sometimes desirable to limit the exposure of the metallocene or treated solid oxide to the aluminum alkyl, in which case only a small amount of aluminum alkyl can be introduced into the precontacting vessel, either alone or from a solution also containing the olefin and metallocene, while the remainder of the aluminum alkyl can be fed directly into the reactor. Likewise, the amount of olefin fed as part of the catalyst preparation may be fed from multiple sources. For example, 1-hexene may be added to the metallocene solution in a first precontacting step to form a first precontacted solution, more 1-hexene may be added separately in a second precontacting step to form a second precontacted solution, and still morel-hexene may be added directly to the reactor. Similarly any of the other catalyst components can also be added in multiple steps to the entire reactor system.

After the polymers are produced, they can be formed into various articles, including but not limited to, household containers, utensils, film products, drums, fuel tanks, pipes, geomembranes, and liners. Various processes can form these articles. In one aspect, additives and modifiers can be added to the polymer in order to provide particular desired effects.

Definitions

In order to more clearly define the terms used herein, the following definitions are provided. To the extent that any definition or usage provided by any document incorporated herein by reference conflicts with the definition or usage provided herein, the definition or usage provided herein controls.

The term polymer is used herein to mean homopolymers comprising ethylene, copolymers of ethylene and another olefinic comonomer, or any combination thereof. The term polymer is also used herein to mean homopolymers and copolymers of acetylenes.

The term cocatalyst is used herein to refer to the at least one organoaluminum compound that constitutes a component of the catalyst mixture. Typical cocatalysts are trialkyl aluminum compounds, dialkyl aluminum halide compounds, and alkyl aluminum dihalide compounds. The term cocatalyst may be used regardless of the actual function of the compound or any chemical mechanism by which the compound may operate.

The term inert atmosphere is used herein to refer to any type of ambient atmosphere that is substantially unreactive toward the particular reaction, process, or material around which the atmosphere surrounds or blankets. Thus, this term is typically used herein to refer to the use of a substantially oxygen-free and moisture-free blanketing gas, including but not limited to dry argon, dry nitrogen, dry helium, or mixtures thereof, when any precursor, component, intermediate, or product of a reaction or process is sensitive to particular gases or moisture. Additionally, inert atmosphere is also used herein to refer to the use of dry air as a blanketing atmosphere when the precursors, components, intermediates, or products of the reaction or process are only moisture-sensitive and not oxygen-sensitive. However, inert atmosphere as used herein would typically exclude $CO_2$ or CO because these gases would be expected to be reactive toward the particular reaction, process, or material around which they would surround or blanket, despite their occasional use as inert blanketing gases in other processes.

The term precontacted mixture is used herein to describe a first mixture of catalyst components that are contacted for a first period of time prior to the first mixture being used to form a postcontacted or second mixture of catalyst components that are contacted for a second period of time. In one aspect of the invention, the precontacted mixture describes a mixture of metallocene, borinic acid or boronic acid before this mixture is contacted with the acidic activator-support and an organoaluminum compound. Thus, precontacted describes components that are used to contact each other, but prior to contacting the components in the second, postcontacted mixture. Accordingly, this invention may occasionally distinguish between a component used to prepare the precontacted mixture and that component after the mixture has been prepared. For example, according to this description, it is possible for the precontacted metallocene and the borinic acid or boronic acid to have reacted to form at least one different chemical compound, formulation, or structure from the distinct compounds used to prepare the precontacted mixture.

Similarly, the term postcontacted mixture is used herein to describe a second mixture of catalyst components that are contacted for a second period of time, and one constituent of which is the precontacted or first mixture of catalyst components that were contacted for a first period of time. Typically, the term postcontacted mixture is used herein to describe the mixture of metallocene, borinic acid or boronic acid, acidic activator-support and organoaluminum compound formed from contacting the precontacted mixture of a portion of these components with the any additional components added to make up the postcontacted mixture. Generally, the additional component added to make up the postcontacted mixture is the acidic activator-support, and an organoaluminum compound. Accordingly, this invention may also occasionally distinguish between a component used to prepare the postcontacted mixture and that component after the mixture has been prepared.

The term metallocene is used herein to refer to metallocene and metallocene-like compounds containing at least one $\eta^5$-alkadienyl ligand, in one aspect at least one $\eta^5$-cycloalkadienyl ligand, and in another aspect at least one $\eta^5$-cyclopentadienyl ligand, or its analogs or derivatives. Thus, the metallocenes of this invention typically comprise at least one cyclopentadienyl, indenyl, fluorenyl, or boratabenzene ligand, or substituted derivatives thereof. Possible substituents on these ligands include hydrogen, therefore the description "substituted derivatives thereof" in this invention comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene may be referred to simply as the "catalyst", in much the same way the term "cocatalyst" may be used herein to refer to an organoaluminum compound.

The terms catalyst composition, catalyst mixture, and the like are used herein to refer to either the precontacted mixture or the postcontacted mixture as the context requires. The use of these terms does not depend upon the actual product of the reaction of the components of the mixtures, the nature of the active catalytic site, or the fate of the metallocene compound, or the borinic acid or boronic acid used to prepare the precontacted mixture, or the specific reactions of the acidic activator-support and the organoaluminum after combining these components. Therefore, the terms catalyst composition, catalyst mixture, and the like include both heterogeneous compositions and homogenous compositions.

The term hydrocarbyl is used to specify a hydrocarbon radical group that includes, but is not limited to aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, heteroatom substituted derivatives thereof.

The terms solid acidic activator-support, acidic activator-support, or simply activator-support, and the like are used herein to indicate a treated, solid, inorganic oxide of relatively high porosity, which exhibits Lewis acidic or Brønsted acidic behavior, and which has been treated with an electron-withdrawing component, typically an anion, and which is calcined. The electron-withdrawing component is typically an electron-withdrawing anion source compound. Thus, in one aspect, the treated solid oxide compound comprises the calcined contact product of at least one solid oxide compound with at least one electron-withdrawing anion source compound. In another aspect, the activator-support or "treated solid oxide compound" comprises at least one ionizing, acidic solid oxide compound. The terms support or activator-support are not used to imply these components are inert, and this component should not be construed as an inert component of the catalyst composition.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed above and throughout the text are provided solely for their disclosure prior to the filing date of the present application. Nothing herein is to be construed as an admission that the inventors are not entitled to antedate such disclosure by virtue of prior invention.

For any particular compound disclosed herein, any general structure presented also encompasses all conformational isomers, regioisomers, and stereoisomers that may arise from a particular set of substituents. The general structure also encompasses all enantiomers, diastereomers, and other optical isomers whether in enantiomeric or racemic forms, as well as mixtures of stereoisomers, as the context requires.

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims.

In the following examples, unless otherwise specified, the syntheses and preparations described therein were carried out under an inert atmosphere such as nitrogen or argon. Solvents were purchased from commercial sources and were typically dried over activated alumina prior to use. Unless otherwise specified, reagents were obtained from commercial sources.

EXAMPLE 1

Preparation of a Fluorided Silica-Alumina Acidic Activator-Support

The silica-alumina used to prepare the fluorided silica-alumina acidic activator-support in this Example was obtained from W.R. Grace as Grade MS13-110, containing 13% alumina, having a pore volume of about 1.2 cc/g and a surface area of about 400 m$^2$/g. This material was fluorided by impregnation to incipient wetness with a solution containing ammonium bifluoride in an amount sufficient to equal 10 wt % of the weight of the silica-alumina. This impregnated material was then dried in a vacuum oven for 8 hours at 100° C. The thus-fluorided silica-alumina samples were then calcined as follows. About 10 grams of the alumina were placed in a 1.75-inch quartz tube fitted with a sintered quartz disk at the bottom. While the silica was supported on the disk, dry air was blown up through the disk at the linear rate of about 1.6 to 1.8 standard cubic feet per hour. An electric furnace around the quartz tube was used to increase the temperature of the tube at the rate of about 400° C. per hour to a final temperature of about 450° C. At this temperature, the silica-alumina was allowed to fluidize for three hours in the dry air. Afterward, the silica-alumina was collected and stored under dry nitrogen, and was used without exposure to the atmosphere.

EXAMPLE 2

Preparation of a Precontacted/Postcontacted Catalyst Composition and Comparison of its Polymerization Activity with a Standard Catalyst Composition All polymerization runs were conducted in a one-gallon (3.785 liter) stainless steel reactor. This reactor employed an air-operated stirrer with a three bladed propeller and was set to operate at 900 rpm for the duration of a polymerization run. The reactor was also encased in a steel jacket with supply lines leading to a heat exchanger unit that was, in turn, connected to cooling water and a steam line, allowing for temperature control.

A typical polymerization procedure is as follows. The initiation of the charging sequence to the reactor was through an opened charge port while venting with isobutane vapor. One (1) mL of 1M solution of TIBA in hexanes was injected quickly followed by addition of chemically-treated solid oxide in the amount shown in Table 1, followed by the precontacted mixture of metallocene stock solution and borinic acid or boronic acid in the amounts desired to achieve the charge indicated in Table 1. The charge port was closed and 50 grams of 1-hexene and 2 liters of isobutane backed by nitrogen pressure were added. The contents of the reactor were stirred and heated to the desired run temperature, and ethylene was then introduced into the reactor. A mass flow unit allowed the pressure to quickly climb to within 50 psi of the desired run pressure and allowed the smooth transition of ethylene flow until the specified pressure and temperature levels were achieved. These temperature and pressure levels were maintained for the duration of the run. At the completion of the run time the ethylene flow was stopped and the reactor pressure was slowly vented off. When the pressure and temperature were safely low, the reactor was opened and the granular polymer powder collected. Activity was specified as either grams of polymer produced per gram of chemically-treated solid oxide or transition metal charged, per hour.

As Table 1 indicates, the comparative catalyst in runs 1-9 exhibited a lower catalyst activity than the inventive catalyst in runs 10-15.

TABLE 1

Polymerization Data Related to Components and Conditions.

| Run Number | Metallocene[1] | Borinic or Boronic acid[2] | Metallocene to Borinic or Boronic acid ratio | Run Time (min) | Catalyst Weight (mmol Zr) | Solid Polymer (g) | Catalyst Activity (kg/mmol Zr/hr) | MI (g 10/min) | HLMI (g 10/min) |
|---|---|---|---|---|---|---|---|---|---|
| 1 | A | — | — | 30 | 0.004 | 255 | 128 | 0 | 0.37 |
| 2 | A | — | — | 40 | 0.004 | 342 | 128 | 0 | 0 |
| 3 | B | — | — | 30 | 0.004 | 247 | 124 | 0 | 175 |
| 4 | B | — | — | 40 | 0.004 | 350 | 131 | 0 | 0.35 |
| 5 | B | W | 1:1 | 40 | 0.004 | 338 | 127 | 0 | 0.25 |
| 6 | B | X | 1:1 | 30 | 0.004 | 275 | 138 | 0 | 0 |
| 7 | B | Y | 1:1 | 30 | 0.004 | 259 | 130 | 0 | 0 |
| 8 | B | Z | 1:2 | 30 | 0.004 | 250 | 125 | 0 | 0 |
| 9 | A | Y | 1:1 | 40 | 0.004 | 303 | 114 | 0 | 0 |
| 10 | A | W | 1:1 | 30 | 0.004 | 350 | 175 | 0 | 0 |
| 11 | A | W | 1:1 | 30 | 0.004 | 365 | 183 | 0 | 0 |
| 12 | A | X | 1:1 | 30 | 0.004 | 419 | 210 | 0 | 0 |
| 13 | A | X | 1:1 | 30 | 0.004 | 426 | 213 | 0 | 0 |
| 14 | A | Z | 1:2 | 30 | 0.004 | 488 | 244 | 0 | 0 |
| 15 | A | Z | 1:2 | 30 | 0.004 | 504 | 252 | 0 | 0 |

Solid activator-support was flourided silica-alumina (200 mg).
The trialkylaluminum was triisobutylaluminum, 1 mL (1M in hexane).
Polymerization conditions:
run temperature of 90 C., total pressure 550 psi in 2liters isobutane, 50 gms 1-hexene.
[1]Metallocene A is $Cp_2ZrMe_2$ Metallocene B is $Cp_2ZrCl_2$
[2]Boronic acid W is pentafluorophenylboronic acid, $(F5C6)B(OH)_2$ Boronic acid X is phenylboronic acid, $(C6H5)B(OH)_2$ Boronic acid Y is methylboronic acid, $MeB(OH)_2$ Borinic acid Z is dimesityborinic acid, $(Me3H2C6)_2B(OH)$

We claim:

1. A catalyst composition consisting essentially of:
   at least one precontacted metallocene;
   at least one precontacted borinic acid or boronic acid;
   at least one postcontacted acidic activator-support;
   and at least one postcontacted organoaluminum compound.

2. The catalyst composition of claim 1, wherein the precontacted metallocene comprises a compound having the following formula:

$$(X^1)(X^2)(X^3)(X^4)M^1,$$

wherein $M^1$ is titanium, zirconium, or hafnium;
   wherein $(X^1)$ is independently a cyclopentadienyl, indenyl, fluorenyl, boratabenzene, substituted cyclopentadienyl, substituted indenyl, substituted fluorenyl, or substituted boratabenzene;
   wherein each substituent on the substituted cyclopentadienyl, substituted indenyl, substituted fluorenyl or substituted boratabenzene of $(X^1)$ is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms, a halide, or hydrogen;
   wherein at least one substituent on $(X^1)$ is optionally a bridging group that connects $(X^1)$ and $(X^2)$;
   wherein $(X^2)$ is independently a cyclopentadienyl group, an indenyl group, a fluorenyl group, a boratabenzene group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms, or a halide;
   wherein each substituent on the substituted $(X^2)$ is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a boron group, an aluminum group, an inorganic group, an organometallic group, or a substituted derivative thereof, any one of which having from 1 to about 20 carbon atoms, a halide, or hydrogen; and
   wherein at least one substituent on $(X^2)$ is optionally a bridging group that connects $(X^1)$ and $(X^2)$; and
   wherein $(X^3)$ and $(X^4)$ are independently an aliphatic group, an aromatic group, a cyclic group, a combination of aliphatic and cyclic groups, an organometallic group, or a substituted derivative thereof, any one of which having from 1 to about 20 carbon atoms.

3. The catalyst composition of claim 1, wherein the precontacted metallocene comprises a metallocene compound selected from:
   bis(cyclopentadienyl)hafnium dimethyl;
   bis(indenyl)zirconium dibenzyl;
   bis(cyclopentadienyl)zirconium dimethyl;
   1,2-ethanediylbis($\eta^5$-1-indenyl)dimethylzirconium;
   3,3-pentanediylbis($\eta^5$-4,5,6,7-tetrahydro-1-indenyl) hafnium dimethyl;
   methylphenylsilylbis($\eta^5$-4,5,6,7-tetrahydro-1-indenyl) zirconium dimethyl;
   bis(1-n-butyl-3-methyl-cyclopentadienyl)zirconium dimethyl;
   bis(n-butylcyclopentadienyl)zirconium dimethyl;
   dimethylsilylbis(1-indenyl)zirconium dimethyl;
   octylphenylsilylbis(1-indenyl)hafnium dimethyl;

dimethylsilylbis($\eta^5$-4,5,6,7-tetrahydro-1-indenyl)zirconium dimethyl;
dimethylsilylbis(2-methyl-1-indenyl)zirconium dimethyl;
1,2-ethanediylbis(9-fluorenyl)zirconium dimethyl;
indenyl dimethyl titanium(IV) chloride;
(isopropylamidodimethylsilyl)cyclopentadienyltitanium dimethyl;
bis(pentamethylcyclopentadienyl)zirconium dimethyl;
bis(indenyl)zirconium dimethyl;
methyloctylsilylbis(9-fluorenyl)zirconium dimethyl;
bis(2,7-di-tert-butylfluorenyl)-ethan-1,2-diyl)zirconium (IV) dimethyl;
methyl-3-butenylmethylidene($\eta^5$-cyclopentadienyl)($\eta^5$-9-fluorenyl)zirconium dimethyl;
methyl-3-butenylmethylidene($\eta^5$-cyclopentadienyl)($\eta^5$-2,7-di-t-butyl-9-fluorenyl)zirconium dimethyl;
methyl-4-pentenylmethylidene($\eta^5$-cyclopentadienyl)($\eta^5$-9-fluorenyl)zirconium dimethyl;
methyl-4-pentenylmethylidene($\eta^5$-cyclopentadienyl)($\eta^5$-2,7-di-t-butyl-9-fluorenyl)zirconium dimethyl;
phenyl-3-butenylmethylidene($\eta^5$-cyclopentadienyl)($\eta^5$-9-fluorenyl)zirconium dimethyl;
phenyl-3-butenylmethylidene($\eta^5$-cyclopentadienyl)($\eta^5$-2,7-di-t-butyl-9-fluorenyl)zirconium dimethyl;
phenyl-4-pentenylmethylidene($\eta^5$-cyclopentadienyl)($\eta^5$-9-fluorenyl)zirconium dimethyl;
phenyl-4-pentenylmethylidene($\eta^5$-cyclopentadienyl)($\eta^5$-2,7-di-t-butyl-9-fluorenyl)zirconium dimethyl.

4. The catalyst composition of claim 1, wherein the precontacted borinic acid comprises a compound having the formula:

$$R_2B(OH)$$

wherein R is independently: an aliphatic group, an aromatic group, a substituted aromatic group, a cyclic group, or a combination thereof wherein at least one R is an aromatic group or a substituted aromatic group; or
the precontacted boronic acid comprises a compound having the following formula:

$$RB(OH)_2$$

wherein R is independently: an aromatic group, or a substituted aromatic group.

5. The catalyst composition of claim 1, wherein the postcontacted acidic activator-support comprises a solid oxide treated with an electron-withdrawing anion, wherein:
the solid oxide is silica, alumina, silica-alumina, aluminum phosphate, heteropolytungstates, titania, zirconia, magnesia, boria, zinc oxide, mixed oxides thereof, or mixtures thereof; and
the electron-withdrawing anion is fluoride, chloride, bromide, phosphate, triflate, bisulfate, sulfate, or any combination thereof.

6. The catalyst composition of claim 1, wherein the postcontacted acidic activator-support comprises fluorided silica-alumina.

7. The catalyst composition of claim 6 wherein the fluorided silica-alumina comprises from about 5% to about 95% by weight alumina and from about 2% to about 50% by weight fluoride ion, based on the weight of the fluorided silica-alumina after drying but before calcining.

8. The catalyst composition of claim 6, wherein the fluorided silica-alumina comprises silica-alumina having a pore volume greater than about 0.5 cc/g, and a surface area greater than about 100 m$^2$/g.

9. The catalyst composition of claim 1, wherein the postcontacted organoaluminum compound comprises an organoaluminum compound with the following formula:

$$Al(X^5)_n(X^6)_{3-n},$$

wherein (X$^5$) is a hydrocarbyl having from 2 to about 20 carbon atoms; (X$^6$) is an alkoxide or aryloxide, any one of which having from 1 to about 20 carbon atoms, halide, or hydride; and n is a number from 1 to 3, inclusive.

10. The catalyst composition of claim 1, wherein the postcontacted organoaluminum compound comprises triethylaluminum (TEA), tripropylaluminum, diethylaluminum ethoxide, tributylaluminum, diisobutylaluminum hydride, triisobutylaluminum, diethylaluminum chloride, or combinations thereof.

11. The catalyst composition of claim 1, wherein the precontacted metallocene comprises bis(cyclopentadienyl)zirconium dimethyl, or bis(indenyl)zirconium dibenzyl; the precontacted borinic acid or boronic acid comprises pentafluorophenylboronic acid, phenylboronic acid, bis(mesityl)borinic acid or methylboronic acid; the postcontacted acidic activator-support comprises fluorided silica-alumina and the postcontacted organoaluminum compound comprises triisobutylaluminum.

12. The catalyst composition of claim 1, wherein the mole ratio of the borinic acid or boronic acid to the metallocene in the precontacted mixture is from about 1:10 to about 10:1.

13. The catalyst composition of claim 1, wherein the weight ratio of the metallocene to the acidic activator-support is from about 1:1 to about 1:1,000,000.

14. The catalyst composition of claim 1, wherein the weight ratio of the acidic activator-support to the organoaluminum compound is from about 1:5 to about 1000:1.

15. A process to produce a catalyst composition, comprising:
contacting at least one metallocene and at least one borinic acid or boronic acid for a first period of time to form a precontacted mixture consisting essentially of at least one precontacted metallocene and at least one precontacted borinic acid or boronic acid; and
contacting the precontacted mixture with at least one acidic activator-support and at least one organoaluminum compound for a second period of time to form a postcontacted mixture consisting essentially of at least one postcontacted metallocene, at least one postcontacted borinic acid or boronic acid compound, at least one postcontacted acidic activator-support and at least one postcontacted organoaluminum compound.

16. The process of claim 15, wherein the metallocene and the borinic acid or boronic acid are precontacted for a first period of time from about 1 minute to about 24 hours in the precontacted mixture.

17. The process of claim 15, wherein the precontacted mixture and the acidic activator-support are contacted for a second period of time from about 1 minute to about 24 hours in the postcontacted mixture.

18. The process of claim 15, wherein the precontacted metallocene comprises a metallocene compound with the following formula:

$$(X^1)(X^2)(X^3)(X^4)M^1,$$

wherein M$^1$ is titanium, zirconium, or hafnium;
wherein (X$^1$) is independently a cyclopentadienyl, indenyl, fluorenyl, boratabenzene, substituted cyclopentadienyl, substituted indenyl, substituted fluorenyl, or substituted boratabenzene;

wherein each substituent on the substituted cyclopentadienyl, substituted indenyl, substituted fluorenyl or substituted boratabenzene of ($X^1$) is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms, a halide, or hydrogen;

wherein at least one substituent on ($X^1$) is optionally a bridging group that connects ($X^1$) and ($X^2$);

wherein ($X^2$) is independently a cyclopentadienyl group, an indenyl group, a fluorenyl group, a boratabenzene group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide;

wherein each substituent on the substituted ($X^2$) is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms, a halide, or hydrogen;

wherein at least one substituent on ($X^2$) is optionally a bridging group that connects ($X^1$) and ($X^2$); and wherein ($X^3$) and ($X^4$) are independently an aliphatic group, an aromatic group, a cyclic group, a combination of aliphatic and cyclic groups, an organometallic group, or a substituted derivative thereof, any one of which having from 1 to about 20 carbon atoms.

19. The process of claim 15, wherein the precontacted metallocene comprises a metallocene compound selected from:
bis(cyclopentadienyl)hafnium dimethyl;
bis(indenyl)zirconium dibenzyl;
bis(cyclopentadienyl)zirconium dimethyl;
1,2-ethanediylbis($\eta^5$-1-indenyl)dimethylzirconium;
3,3-pentanediylbis($\eta^5$-4,5,6,7-tetrahydro-1-indenyl) hafnium dimethyl;
methylphenylsilylbis($\eta^5$-4,5,6,7-tetrahydro-1-indenyl) zirconium dimethyl;
bis(1-n-butyl-3-methyl-cyclopentadienyl)zirconium dimethyl;
bis(n-butylcyclopentadienyl)zirconium dimethyl;
dimethylsilylbis(1-indenyl)zirconium dimethyl;
octylphenylsilylbis(1-indenyl)hafnium dimethyl;
dimethylsilylbis($\eta^5$-4,5,6,7-tetrahydro-1-indenyl)zirconium dimethyl;
dimethylsilylbis(2-methyl-1-indenyl)zirconium dimethyl;
1,2-ethanediylbis(9-fluorenyl)zirconium dimethyl;
indenyl dimethyl titanium(IV) chloride;
(isopropylamidodimethylsilyl)cyclopentadienyltitanium dimethyl;
bis(pentamethylcyclopentadienyl)zirconium dimethyl;
bis(indenyl)zirconium dimethyl;
methyloctylsilylbis(9-fluorenyl)zirconium dimethyl;
bis(2,7-di-tert-butylfluorenyl)-ethan-1,2-diyl)zirconium (IV) dimethyl;
methyl-3-butenylmethylidene($\eta^5$-cyclopentadienyl)($\eta^5$-9-fluorenyl)zirconium dimethyl;
methyl-3-butenylmethylidene($\eta^5$-cyclopentadienyl)($\eta^5$-2,7-di-t-butyl-9-fluorenyl)zirconium dimethyl;
methyl-4-pentenylmethylidene($\eta^5$-cyclopentadienyl)($\eta^5$-9-fluorenyl)zirconium dimethyl;
methyl-4-pentenylmethylidene($\eta^5$-cyclopentadienyl)($\eta^5$-2,7-di-t-butyl-9-fluorenyl)zirconium dimethyl;
phenyl-3-butenylmethylidene($\eta^5$-cyclopentadienyl)($\eta^5$-9-fluorenyl)zirconium dimethyl;
phenyl-3-butenylmethylidene($\eta^5$-cyclopentadienyl)($\eta^5$-2,7-di-t-butyl-9-fluorenyl)zirconium dimethyl;
phenyl-4-pentenylmethylidene($\eta^5$-cyclopentadienyl)($\eta^5$-9-fluorenyl)zirconium dimethyl; or
phenyl-4-pentenylmethylidene($\eta^5$-cyclopentadienyl)($\eta^5$-2,7-di-t-butyl-9-fluorenyl)zirconium dimethyl.

20. The process of claim 15, wherein the precontacted borinic acid comprises a compound having the formula:

$$R_2B(OH)$$

wherein R is independently: an aliphatic group, an aromatic group, a substituted aromatic group, a cyclic group, or any combination thereof wherein at least one R is an aromatic group or a substituted aromatic group; or the precontacted boronic acid comprises a compound having the following formula:

$$RB(OH)_2$$

wherein R is independently: an aromatic group, or a substituted aromatic group.

21. The process of claim 17, further comprising contacting the precontacted mixture and the acidic activator-support with at least one organoaluminum compound with the following formula:

$$Al(X^5)_n(X^6)_{3-n},$$

wherein ($X^5$) is a hydrocarbyl having from 1 to about 20 carbon atoms; ($X^6$) is an alkoxide or aryloxide, any one of which having from 1 to about 20 carbon atoms, halide, or hydride; and n is a number from 1 to 3, inclusive, for a second period of time, to form a postcontacted mixture comprising at least one postcontacted metallocene, at least one postcontacted organoaluminum compound, at least one postcontacted borinic acid or boronic acid, and at least one postcontacted acidic activator-support.

22. The process of claim 21, wherein the organoaluminum compound comprises triethylaluminum (TEA), tripropylaluminum, diethylaluminum ethoxide, tributylaluminum, diisobutylaluminum hydride, triisobutylaluminum, diethylaluminum chloride, or combinations thereof.

23. The process of claim 15, wherein the postcontacted acidic activator-support comprises a solid oxide such as silica, alumina, titania, zirconia, magnesia, boria, zinc oxide, mixed oxides thereof, or mixtures thereof, wherein the inorganic oxide has been treated with an electron-withdrawing anion comprising fluoride, chloride, bromide, phosphate, triflate, bisulfate, sulfate, or combinations thereof.

24. The process of claim 15, wherein the postcontacted acidic activator-support comprises fluorided silica-alumina.

25. The process of claim 15, wherein the fluorided silica-alumina comprises from about 5% to about 95% by weight alumina and from about 2% to about 50% by weight fluoride ion, based on the weight of the fluorided silica-alumina after drying but before calcining.

26. The process of claim 24, wherein the fluorided silica-alumina comprises silica-alumina having a pore volume greater than about 0.5 cc/g, and a surface area greater than about 100 m²/g.

27. The process of claim 15, wherein the precontacted metallocene comprises, bis(cyclopentadienyl)zirconium dimethyl; the precontacted borinic acid or boronic acid comprises pentafluorophenylboronic acid, phenylboronic acid, bis(mesityl)borinic acid or methylboronic acid; the postcontacted acidic activator-support comprises fluorided silica-alumina; and the postcontacted organoaluminum compound comprises triisobutylaluminum.

28. A catalyst composition comprising:
at least one precontacted metallocene;
at least one precontacted borinic acid or boronic acid;
at least one postcontacted acidic activator-support;
and at least one postcontacted organoaluminum compound;
wherein there is a substantial absence of aluminoxanes in the catalyst composition.

29. The catalyst composition of claim 28, wherein:
the mole ratio of the bonnie acid or boronic acid to the metallocene is from about 1:10 to about 10:1;
the weight ratio of the metallocene to the acidic activator-support is from about 1:1 to about 1:1,000,000; and
the weight ratio of the acidic activator-support to the organoaluminum compound is from about 1:5 to about 1000:1.

* * * * *

UNITED STATES PATENT AND TRADEMARK OFFICE
CERTIFICATE OF CORRECTION

PATENT NO. : 8,058,200 B2  
APPLICATION NO. : 11/749799  
DATED : November 15, 2011  
INVENTOR(S) : Yang et al.

Page 1 of 2

It is certified that error appears in the above-identified patent and that said Letters Patent is hereby corrected as shown below:

In the Claims

| | |
|---|---|
| Column 39, line 31: | "consisting essentially of" should be changed to --consisting of-- |
| Column 42, lines 27-28: | "in the precontacted mixture" should be deleted |
| Column 42, line 38: | "consisting essentially of" should be changed to --consisting of-- |
| Column 42, line 45: | "consisting essentially of" should be changed to --consisting of-- |
| Column 42, lines 49-53: | "the metallocene and the borinic acid or boronic acid are precontacted for a first period of time from about 1 minute to about 24 hours in the precontacted mixture" should be changed to --the first period of time is from about 1 minute to about 24 hours-- |
| Column 42, lines 54-57: | "the precontacted mixture and the acidic activator-support are contacted for a second period of time from about 1 minute to about 24 hours in the postcontacted mixture" should be changed to --the second period of time is from about 1 minute to about 24 hours-- |
| Column 44, lines 37-40: | "The process of claim 17, further comprising contacting the precontacted mixture and the acidic activator-support with at least one organoaluminum compound with the following formula" should be changed to --The process of claim 15, wherein the at least one organoaluminum compound has the following formula-- |
| Column 44, lines 46-51: | ", for a second period of time, to form a postcontacted mixture comprising at least one postcontacted metallocene, at least one postcontacted organoaluminum compound, at least one postcontacted borinic acid or boronic acid, and at least one postcontacted acidic activator-support" should be deleted |
| Column 44, lines 52-53: | "The process of claim 21, wherein the organoaluminum compound" should be changed to --The process of claim 15, wherein the at least one organoaluminum compound-- |
| Column 44, lines 57-63: | "comprises a solid oxide such as silica, alumina, titania, zirconia, magnesia, boria, zinc oxide, mixed oxides thereof, or mixtures thereof, wherein the inorganic oxide has been treated with an |

Signed and Sealed this  
Twenty-ninth Day of March, 2016

Michelle K. Lee  
*Director of the United States Patent and Trademark Office*

CERTIFICATE OF CORRECTION (continued)
U.S. Pat. No. 8,058,200 B2

| | |
|---|---|
| | electron-withdrawing anion comprising fluoride, chloride, bromide, phosphate, triflate, bisulfate, sulfate or combinations thereof" should be changed to --comprises a solid oxide treated with an electron-withdrawing anion, wherein the solid oxide comprises silica, alumina, titania, zirconia, magnesia, boria, zinc oxide, a mixed oxide thereof, or a mixture thereof; and the electron-withdrawing anion comprises fluoride, chloride, bromide, phosphate, triflate, bisulfate, sulfate, or any combination thereof-- |
| Column 44, line 66: | "The process of claim 15" should be changed to --The process of claim 24-- |
| Column 46, line 1: | "A catalyst composition comprising" should be changed to --A catalyst composition consisting of-- |
| Column 46, lines 7-8: | "wherein there is a substantial absence of aluminoxanes in the catalyst composition" should be changed to --wherein the weight ratio of the metallocene to the acidic activator-support is from about 1:1 to about 1:1,000,000; and the weight ratio of the acidic activator-support to the organoaluminum compound is from about 1:5 to about 1000:1-- |
| Column 46, line 10: | "the bonnie acid" should be changed to --the borinic acid-- |
| Column 46, lines 12-16: | "the weight ratio of the metallocene to the acidic activator-support is from about 1:1 to about 1:1,000,000; and the weight ratio of the acidic activator-support to the organoaluminum compound is from about 1:5 to about 1000:1" should be deleted |